United States Patent
Taroda et al.

(10) Patent No.: US 6,505,273 B2
(45) Date of Patent: *Jan. 7, 2003

(54) DISK CONTROL DEVICE AND METHOD PROCESSING VARIABLE-BLOCK AND FIXED-BLOCK ACCESSES FROM HOST DEVICES

(75) Inventors: Yuichi Taroda; Masao Fukuchi, both of Kawasaki; Wasako Takahashi, Yamato, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,461

(22) Filed: Nov. 24, 1998

(65) Prior Publication Data

US 2001/0014929 A1 Aug. 16, 2001

(30) Foreign Application Priority Data

May 22, 1998 (JP) ............................................ 10-140922

(51) Int. Cl.⁷ .............................................. G06F 12/00
(52) U.S. Cl. ........................ 711/112; 711/114; 711/111; 711/113
(58) Field of Search ........................ 711/111, 112, 114, 711/113, 122; 369/54, 58; 714/752, 5, 762, 785

(56) References Cited

U.S. PATENT DOCUMENTS

| | | | | |
|---|---|---|---|---|
| 5,459,853 A | * | 10/1995 | Best et al. ................... | 711/114 |
| 5,610,929 A | * | 3/1997 | Yamamoto ................... | 714/785 |
| 5,617,432 A | * | 4/1997 | Eggenberger et al. ...... | 714/752 |
| 5,627,990 A | * | 5/1997 | Cord et al. .................. | 711/122 |
| 5,724,542 A | * | 3/1998 | Taroda et al. ................ | 711/113 |
| 5,734,663 A | * | 3/1998 | Eggenberger ............... | 714/762 |
| 5,862,363 A | * | 1/1999 | Taroda et al. ................ | 395/500 |
| 5,951,691 A | * | 9/1999 | Ng et al. ......................... | 714/5 |
| 5,968,182 A | * | 10/1999 | Chen et al. ..................... | 714/5 |
| 6,009,498 A | * | 12/1999 | Kumasawa et al. ......... | 711/113 |

OTHER PUBLICATIONS

Yuji Ogawa et al., "F6401A Magnetic Disk Array Unit", Fujitsu Science Technology Journal, 31, 1, pp. 18–28 (Jun. 1995).
The RAIDBook, A Source Book for RAID Technology, Edition 1–1, The RAID Advisory Board, Nov. 18, 1993.
Hitoshi Matsushima, et al., "F1710A File Control Unit and F6493 Array Disk Subsystem", Fujitsu Science Technology Journal, 31, 1, pp. 29–35 (Jun. 1995).

* cited by examiner

*Primary Examiner*—Matthew Kim
*Assistant Examiner*—Brian R. Peugh
(74) *Attorney, Agent, or Firm*—Staas & Halsey LLP

(57) ABSTRACT

The present invention is a disk control device and control method sharing an FBA disk unit between mainframes (global servers) using a variable-block format and open servers using a fixed-block format and which are host devices. The first host device using the variable-block format and the second host device using the fixed-block format connect individually through a dedicated first channel adapter and second channel adapter, respectively. The disk control device includes a conversion function between the variable-block format of the first host device and the fixed-block format of the disk unit. In addition, the second channel adapter includes a conversion function between the fixed-block format of the second host device and the variable-block format of the disk control device. These functions enable the first host device using the variable-block format and the second host device using the fixed-block format to share the resources of the disk unit.

15 Claims, 21 Drawing Sheets

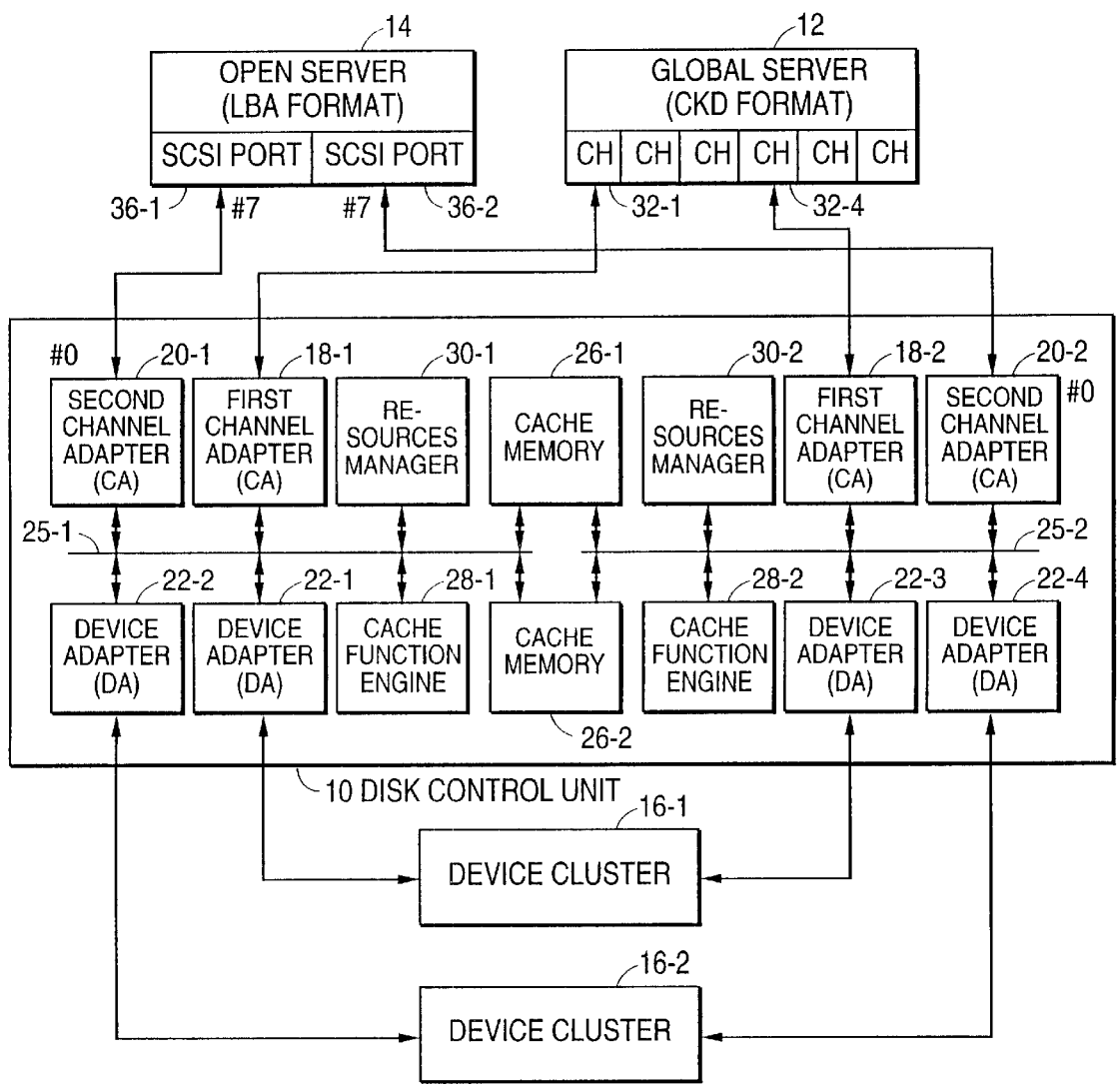

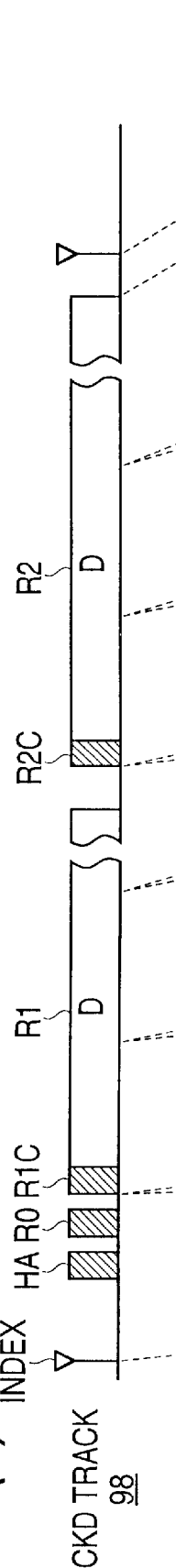
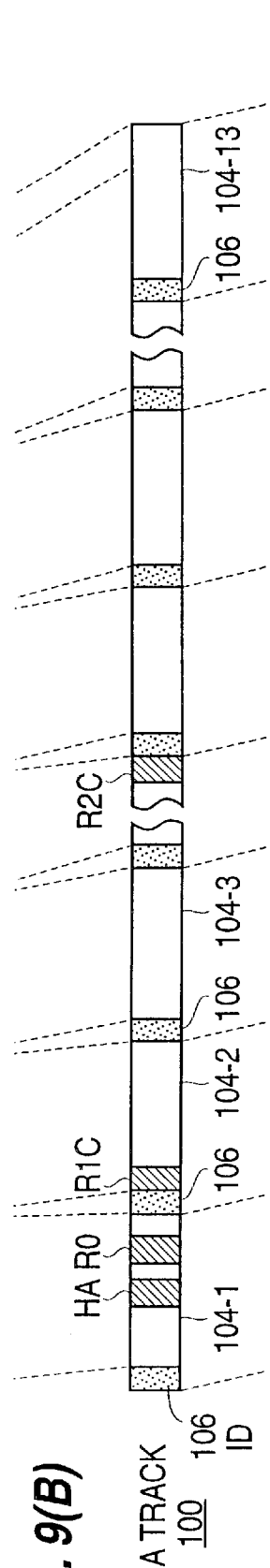
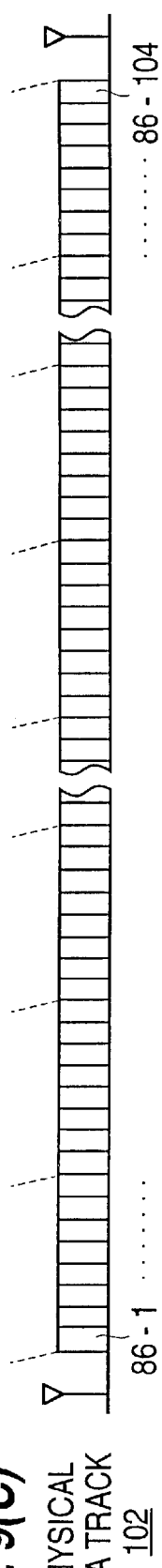
FIG. 9(A) CKD TRACK 98
FIG. 9(B) FBA TRACK 100
FIG. 9(C) PHYSICAL FBA TRACK 102

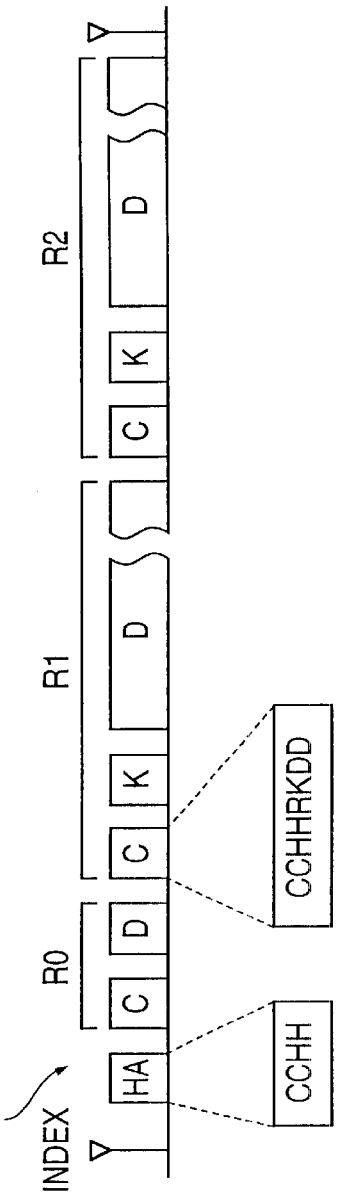
FIG. 10
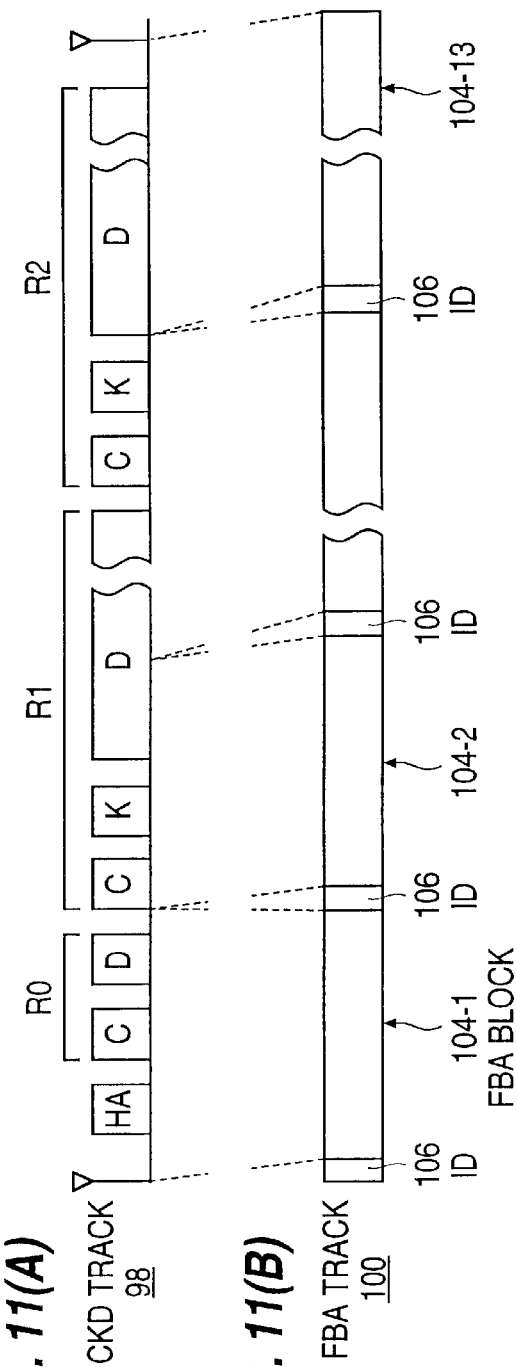
FIG. 11(A)
FIG. 11(B)

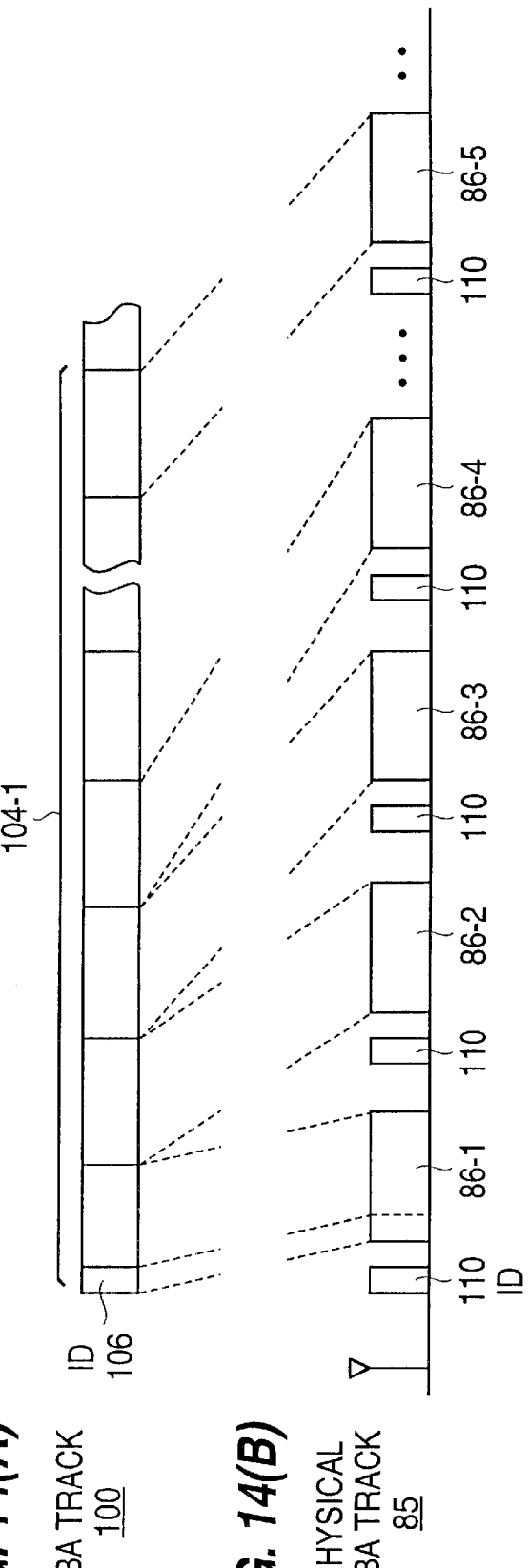

DISK CONTROL DEVICE AND METHOD PROCESSING VARIABLE-BLOCK AND FIXED-BLOCK ACCESSES FROM HOST DEVICES

CROSS-REFERENCE TO RELATED APPLICATIONS

This application is based on, and claims priority to, Japanese Patent application Patent H10-140922 filed May 22, 1998 in Japan, and which is incorporated herein by reference.

BACKGROUND OF THE INVENTION

1. Field of the Invention

The present invention relates to a disk control device and its method of control for processing data. More particularly, the present invention relates to a disk control device and its method of control by writing data to the disk unit via cache memory or reading the data from the disk unit via the cache memory, to transfer the data to host devices, in response to a disk unit host access, particularly for processing variable-block and fixed-block accesses from host devices.

2. Description of the Related Art

A disk subsystem is equipped with a hard disk unit (DASD, also referred to as Direct Access Storage Device) for data input/output, and with a disk control device. The disk control device is installed between a host device and the hard disk unit to control the writing of data to and the reading of data from a hard disk.

As the device operates mechanically, access time for the hard disk unit is measured in milliseconds, which is considerably slower than access time for semiconductor memory. To increase access speed, the disk control device includes a memory implemented with a cache memory, which is referred to as disk cache architecture.

The cache memory stores data and, thereby, copies frequently accessed data from the host system. If the host system accesses the copied data, data is transferred directly from the cache memory. Disk cache architecture is based on system access data tending to be specific data.

The cache memory holds frequently accessed data because the contents of the memory are replaced according to the Least Recently Used (LRU) algorithm. As mechanical operations are not necessary for frequently accessed data, the I/O response time can be reduced considerably.

A global server comprising a mainframe is used to access a hard disk unit in the variable-block Count Key Data (CKD) format, thereby allowing only a CKD-format disk unit (which is a hard disk drive) to be connected to the hard disk control device.

Fixed Block Architecture (FBA) disk units with SCSI or other interface components, however, are advancing technologically and are soon expected to attain a capacity equivalent to conventional CKDs.

In the fixed-block architecture (FBA) format, all logical blocks (FBA blocks) on a logical device are equal. To overlay the CKD format onto the FBA format one CKD track should be divided into a specified number of FBA blocks. FBA blocks divided from one CKD block are identified with unique identification numbers beginning with 0. A 64KB ID for CKD-FBA format conversion, referred to as CKD ON FBA (COF), is set at the beginning of a divided FBA block.

This logical FBA block is divided into physical FBA blocks for an FBA disk unit, and written onto a disk of the FBA disk unit. A physical FBA block includes an ID at the beginning to store an FBA block address.

As this type of FBA disk unit is compact, low-priced, and efficient, a practical disk control device is available for applying an FBA disk unit to a host device that uses the CKD format.

This disk control device has a function for the mutual conversion of CKD-format data of the host device and FBA-format data of the disk control device. This function realizes access to the FBA disk unit compatible with the CKD format of the host device.

Accordingly, the prior art systems include a disk control device which overlays a CKD format onto an FBA format.

What is needed is a disk control device which allows host computers of either a fixed-block format or a variable-block format to share access to a disk unit of a fixed-block format.

SUMMARY OF THE INVENTION

In the field of global servers comprising mainframes, open servers such as UNIX and PC servers are gaining popularity for open systems. If a hard disk subsystem is constructed by connecting an FBA disk unit as an external storage for the mainframe through a disk control device having a CKD-FBA format conversion function, resources are accessed from the global server of the mainframe and are also be shared among UNIX, PC, and other open servers.

When the mainframe (global server) and open servers share resources in a hard disk subsystem, the large-capacity data processing capabilities of the mainframe and the superior processing performance of the open server are utilized for the shared resources.

An object of the present invention is to implement a disk control device component and control method for sharing an FBA disk unit between mainframes (global servers) that use the variable-block format and open servers that use the FBA format and which are host devices.

Another object of the present invention is to provide a disk control device and control method for access utilizing the advantages (which are high performance and reliability) available from host devices that use the variable-block format and the high transaction processing performance available from host devices that use the FBA format.

To accomplish the above-mentioned objects, the present invention is a disk control device comprising a first channel adapter located between a first host device and a disk unit and receiving a variable-block access(CKD)command from the first host device and returning the processing results. The disk control device of the present invention further comprises a second channel adapter located between the second host device and the disk unit and receiving a fixed-block access(FBA) command from the second host device and returning the processing results. In addition, the disk control device of the present invention comprises a device adapter executing an access command from the first or second host device for the disk unit in FBA blocks, a cache memory developing track data as cache blocks in a format that divides a single CKD block into several FBA blocks, a cache function engine controlling the cache memory, and a resources manager managing general resources and controlling processing operations.

The resource manager includes an address conversion unit located at the second channel adapter and converting a fixed-block position address logical block address (LBA) received from the second host device into variable-block position address CCHH.

The resource manager further includes a first controller that calculates an FBA block number of the disk corresponding to variable-block position address CCHH received from the first host device, reads from the disk unit a CKD block containing the FBA block indicated by said FBA block number, develops the block in the cache memory, and searches the cache memory for a record specified by the first host device.

The resource manager also includes a second controller that calculates an FBA block number of the disk corresponding to variable-block position address CCHH received from the second host device, reads from the disk unit a CKD block containing the FBA block indicated by the FBA block number, develops the block in the cache memory, and searches the cache memory for a record specified by the first host device.

The control method of the present invention is included in a disk control device of the present invention comprising a first channel adapter located between a first host device and a disk unit and receiving a variable-block access command from the first host device and returning the processing results, a second channel adapter located between the second host device and the disk unit for receiving a fixed-block access command from the second host device and returning the processing results, a device adapter executing an access command from the first or second host device for the disk unit in FBA blocks, a cache memory developing track data as cache blocks in a format that divides a single CKD block into several FBA blocks, a cache function engine for controlling the cache memory, and a resources manager managing general resources and controlling processing operations.

The control method of the present invention, then, includes a first control process in which a corresponding FBA block number of the disk is determined for a variable-block position address CCHH received from the first host device, a CKD block containing the FBA block of the FBA block number is read from the disk unit and developed in the cache memory, and a cache memory is searched for a record specified by the first host device by referencing the ID correspondence.

The control method of the present invention also includes an address conversion process in which an FBA position address LBA issued from the second host device to the second channel adapter is converted into variable-block position address CCHH.

In addition, the control method of the present invention includes a second control process in which an FBA block number is calculated for a real device corresponding to variable-block position address CCHH obtained during the address conversion process, a CKD block containing the FBA block indicated by the FBA block number is read from the disk unit and developed in the cache memory, and a cache memory is searched for a record specified by the second host device.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a hardware block diagram of the present invention;

FIGS. 9(A), 9(B), and 9(C) show formats of CKD, logical FBA, and physical FBA tracks;

FIG. 10 shows details of a CKD track;

FIGS. 11(A) and 11(B) show correspondence between CKD and logical FBA tracks in the present invention;

FIGS. 14(A) and 14(B) show correspondence between logical and physical FBA tracks in the present invention;

DESCRIPTION OF THE PREFERRED EMBODIMENTS

Figure 1A:
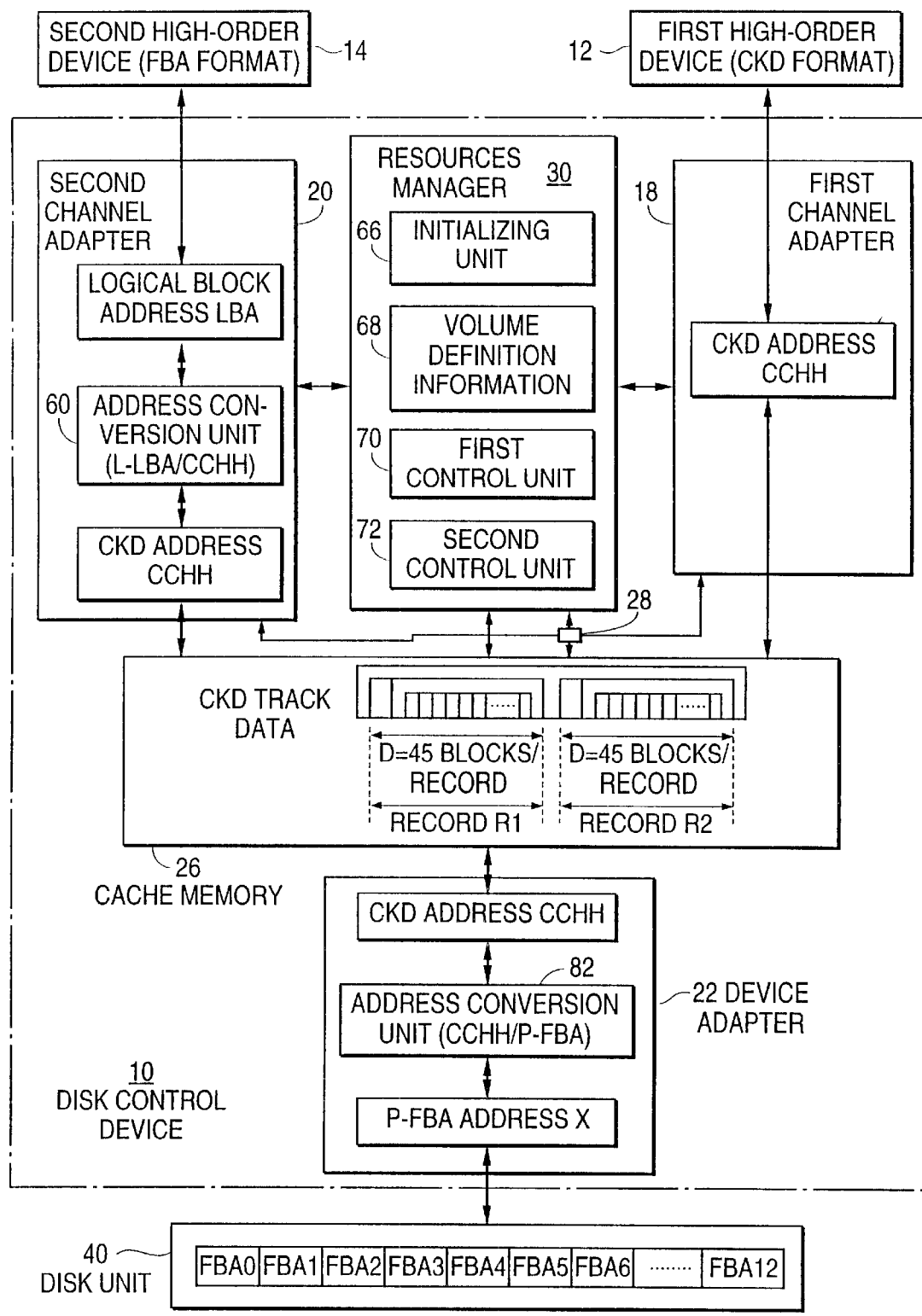
FIGS. 1(A) and 1(B) show a principle of the present invention.
Figure 1B:
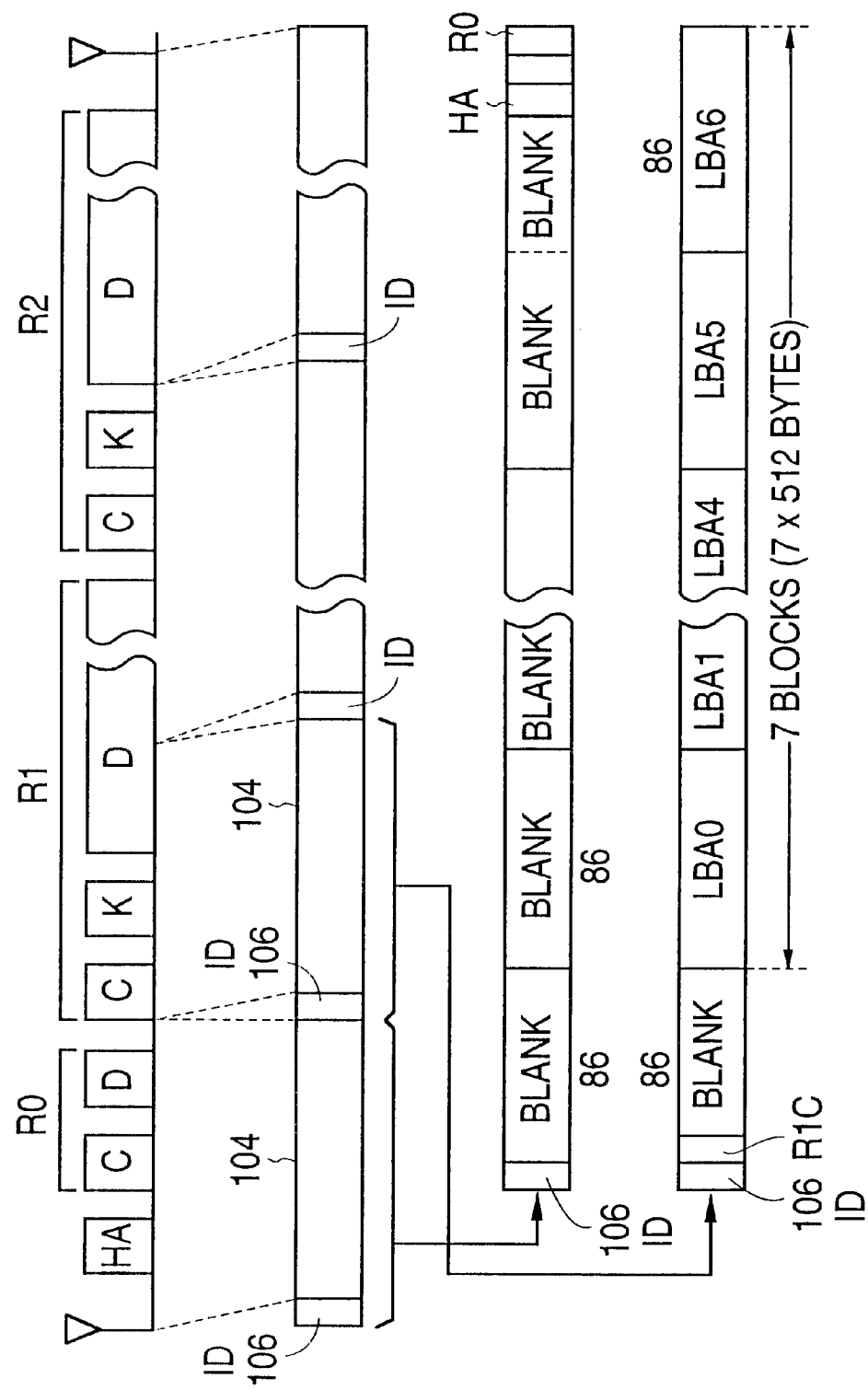

FIGS. 1(A) and 1(B) show a system 1 implementing the principles of the present invention, which reside in disk control device 10 shown in FIG. 1(A).

As shown in FIG. 1(A), the disk control device 10 of the present invention is connected between two host devices 12, 14, and a disk unit 40. The first host device (such as a global server implemented on a mainframe computer) is implemented using a variable-block (or CKD) format 12, the second host device (such as a UNIX or PC open server) is implemented using an FBA format 14, and the disk unit 40 is an FBA disk unit supporting the FBA format.

The disk control device 10 of the present invention includes a first channel adapter 18, a second channel adapter 20, a device adapter 22, a cache memory 26, a cache function engine 28, and a resources manager 30, as explained.

The first channel adapter 18 is installed between the first host device 12 and the disk unit 40. The first channel adapter 18 receives an access command conforming to the variable-block format from the first host device 12 and returns a processing result.

Likewise, the second channel adapter 20 is installed between the second host device 14 and the disk unit 40. The second channel adapter 20 receives an access command conforming to the FBA format from the second host device 14 and returns a processing result.

The device adapter 22 executes an access command received from either the first host device 12 or second host device 14 for the disk unit 40. The device adapter 22 executes the access command in FBA blocks.

In the cache memory 26, one CKD track is divided into FBA blocks and is then developed as cache blocks. A cache block is placed at a specified position of each FBA block, and an ID is added to indicate correspondence between the record numbers and positions in the FBA block. The format of CKD track data is shown in FIG. 9(A), and the format of FBA track data is shown in FIGS. 9(B) and 9(C).

In the cache memory 26 of FIG. 1(A), D refers to the data field in CKD track format, so D=45 blocks/record means that one data field of the CKD format takes 45 blocks of the FBA track format. This relationship is shown and explained in greater detail with reference to FIG. 12 (in which the data field of the CKD format starts from LBA 0 to LBA 39 and includes 40 data blocks and 5 blank blocks).

The cache function engine 28 controls the cache memory 26, and the resources manager 30 manages general resources and controls processing operations.

The present invention provides an address conversion unit 60 to the disk control device 10. When an FBA position address (logical block address) LBA is issued from the second host device 14 to the second channel adapter 20, the address conversion unit 60, residing in the second channel adapter 20, converts the received position address LBA into variable-block position address CCHH, as shown in FIG. 1(A).

Within the resources manager 30, the first control unit 70 is installed for access from the first host device 12, and the second control unit 72 is installed for access from the second host device 14. When variable-block position address CCHH is issued from the first host device 12, the first control unit 70 of the resources manager 30 calculates the FBA block number of the disk unit 40 corresponding to position address CCHH. The first control unit 70 reads a CKD track containing the FBA block indicated by the FBA block number from the disk unit 40 and develops it in the cache memory 26. The first control unit 70 retrieves the record specified by the first host device 12 from the cache memory 26 by referencing correspondence information based on the ID.

When FBA position address LBA is issued from the second host device 14, and variable-block position address CCHH is obtained in the address conversion unit 60, the second control unit 72 of the resources manager 30 calculates the FBA block number of the disk unit 40 corresponding to position address CCHH. The second control unit 72 reads a CKD track containing the FBA block indicated by the FBA block number from the disk unit and develops it in the cache memory 26. The second control unit 72 retrieves the record specified by the second host device 14 from the cache memory 26 by referencing correspondence information based on the ID.

The first host device 12 that uses the variable-block format and the second host device 14 that uses the FBA format can be connected individually through the dedicated first channel adapter 18 and second channel adapter 20. The disk control device 10 of the present invention includes a conversion function between the variable-block format of the first host device 14 and the FBA format of the disk unit 40. In addition to this basic function, the second channel adapter 20 includes a conversion function between the FBA format of the second host device 14 and the variable-block format of the disk control device 10. These functions provided in the present invention enable the first host device 12 that uses the variable-block format and the second host device 14 that uses the FBA format to share the resources of the disk unit 40.

The address conversion unit 60 of the second channel adapter 20 calculates the physical address of the physical block corresponding to the logical address of the logical block as follows:

Physical address=Logical address×(Logical block size/Physical block size)

The variable-block cylinder number is calculated as the quotient of the following:

Cylinder number={Physical address+Number of blocks/track× (Number of tracks/cylinder+1)}/(Number of blocks/track×Number of tracks/cylinder)

The variable-block track number is calculated as the quotient when the remainder of the cylinder number calculation is divided by the number of blocks/track. The variable-block sector number is then calculated from the remainder of the cylinder number calculation and the number of physical blocks in each record.

In an ideal form of the present invention, the second host device (which is an open server) 14 of the FBA format processes an access command to the disk unit 40 for a transaction or other general work. Meanwhile, the first host device 12 that uses the variable-block format processes an access command to the disk unit 40 to back up data of the disk unit 40 generated by accessing the disk unit 40.

The resources manager 30 of the disk control device 10 includes an initializing unit 66. When an initialize command is issued from the first host device 12, the initializing unit 66 divides each CKD track of the disk unit 40 into several FBA blocks. The initializing unit 66 then writes a format data set (sequential data set) at a specified position of each FBA block according to the ID of the data set that indicates correspondence between record numbers and positions in the FBA block. The initializing unit 66 initializes the disk unit 40 in this way.

Elements shown in FIG. 1(A), but not discussed above, are discussed herein below.

FIG. 1(B) illustrates the track format of the disk unit 40 to be initialized by the initializing unit 66. In the track format, one CKD block is divided into FBA blocks 104 of a specified length. An ID is placed at the beginning of each logical FBA block. Records are placed on a CKD track from the back.

Record placement from the back for each logical FBA block makes merge processing unnecessary when attempting to reduce access time by accessing the disk unit 40 in FBA blocks.

The initializing unit 66 shown in FIG. 1(A) divides one CKD block of the disk unit 40 into logical FBA blocks 104, which are an integral multiple of physical FBA blocks 86. Each logical FBA block 104 has an ID (106) at the first physical FBA block position and records at the second and subsequent physical FBA block positions from the back.

As FIG. 1(B) illustrates, one CKD track 100 based on the present invention includes home address HA, record R0 as the system area, and records R1 and R2 as the user area. Therefore, the initializing unit 66 divides a physical FBA block of the disk unit 40 into logical FBA blocks 104, which are an integral multiple of physical FBA blocks 86. Home address HA and record R0 are placed in the first logical FBA block, and records R1 and R2 are placed in the remaining logical FBA blocks from the back.

A sequence of several logical FBA blocks in which records R1 and R2 are placed starts with an ID at the first position of the first physical FBA block. The rest of the first physical FBA block is blank, and record R1 or R2 is divided and positioned sequentially from the second to the last physical FBA block.

For example, a physical FBA block 86 is 512 bytes, and a logical FBA block 104 is 4,096 bytes, eight times greater than a physical FBA block. A track is 53 Kbytes, 13 times greater than a logical FBA block. Records R1 and R2 are 23 Kbytes each, 45 times greater than a physical FBA block 86.

The resources manager 30 includes volume definition information 68, as shown in FIG. 1(A). The volume definition information 68 defines correspondence between the variable-block logical volume number (CKD logical address) of the first host device 12 and the FBA logical volume number (SCSI logical unit number LUN) of the second host device 14.

When an initialize command is received from the first host device 12, the initializing unit 66 formats the disk unit 40 for each variable-block logical volume number specified in the volume definition information 68. When the initializing unit 66 formats the disk unit 40, the second host device (open server) is prevented from accessing the second host adapter 20.

Once the initializing unit 66 has formatted the disk unit 40, the first host device 12 is prevented from accessing the first host adapter 18, and only access to the second host adapter 20 by the second host device 14 is permitted.

Even when only access to the second host adapter 20 by the second host device 14 is valid, a command from the first host device 12 ensures that the resources manager 30 will temporarily deny the second host device 14 access, as well as reads and transfers data from the disk unit 40 for backup. By referencing the volume definition information 68, the resources manager 30 backs up one or more variable-block logical volumes corresponding to an FBA logical volume.

The present invention also provides a control method for the disk control device 10. As FIG. 1(A) illustrates, the disk control device 10 is connected between the first host device 12 (global server on a mainframe computer) of the variable-block format, the second host device 14 (an open server) of the FBA format, and an FBA disk unit 40 supporting the FBA format. The disk control device 10 of the present invention includes a first channel adapter 18, a second channel adapter 20, a device adapter 22, a cache memory 26, a cache function engine 28, and a resources manager 30.

The present invention provides a control method featuring a first control process, an address conversion process, and a second control process.

In the first control process of the present invention a corresponding FBA block number of a disk is determined for variable-block position address CCHH received from a first host device, a CKD block containing the FBA block of the FBA block number is read from the disk unit and developed in a cache memory, and the cache memory is searched for a record specified by the first host device by referencing ID correspondence.

In the address conversion process of the present invention, an FBA position address LBA issued from a second host device to a second channel adapter is converted into variable-block position address CCHH.

Then, in the second control process of the present invention, a corresponding FBA block number is determined for a real device corresponding to variable-block position address CCHH obtained during the address conversion process, a CKD block containing the FBA block of the FBA block number is read from the disk unit and developed in the cache memory, and the cache memory is searched for a record specified by the second host device by referencing ID correspondence.

Details of the control method based on the present invention are basically the same as those of the disk control device 10 of the present invention.

A detailed description of the preferred embodiment of the present invention is now provided, the contents of which are organized as follows:

1. Hardware Configuration
2. Functional Configuration of the Disk Control Device of the present invention
3. Track Format
4. Initializing, Operation, and Backup
5. Cache Control 1. Hardware Configuration FIG. 2 is a block diagram illustrating the hardware configuration of the disk control device 10 of the present invention, shown with host devices 12, 14 and disk device clusters 16-1 and 16-2.

In FIG. 2, a disk control unit (DCU) 10 is placed as the disk control device between host devices and a disk unit. The host devices in the present invention are a global server (mainframe) 12 connected as the first host device for CKD-format access, and an open server (UNIX or PC) 14 connected as the second host device for LBA-format access. Device clusters (16-1, 16-2) with several mounted disk modules are also connected to the disk control unit 10.

The disk control unit 10 of the present invention has a dual configuration. More particularly, the first channel adapters (18-1, 18-2) are provided for the global server 12 and the second channel adapters (20-1, 20-2) for the open server 14. The first channel adapters (18-1, 18-2) are connected to the channel devices (32-1, 32-4) of the global server 12 through channel paths. The second channel adapters (20-1, 20-2) are connected to the open server 14 through SCSI interface paths (36-1, 36-2).

The first channel adapter 20-1 is assigned to SCSI port No. 0 and the SCSI port 36-1 of the open server 14 is assigned to port No. 7. Likewise, the second channel adapter 20-2 is connected to port No. 0 of the other SCSI interface path and the SCSI port 36-2 of the open server 14 is assigned to port No. 7.

Under this configuration, the second channel adapters (20-1, 20-2) are connected separately to the dual SCSI interface paths. However, since SCSI port Nos. 0 to 5 are allocated to the disk control unit 10, the second channel adapters (20-1, 20-2) can be extended up to six units each.

In the disk control unit 10 of the present invention, dual cache memories (26-1, 26-2) are installed to realize a disk cache. Up to six gigabytes can be reserved in the cache memories (26-1, 26-2). For the cache memories (26-1, 26-2), cache function engines (CFEs) (28-1, 28-2) are provided. When access requests are received from host devices, the CFEs control the cache memories in accordance with the LRU algorithm explained herein above.

In the disk control unit 10 of the present invention, device adapters (22-1 through 22-4) are installed. The device adapters (22-1, 22-3) access the device cluster 16-1 while the device adapters (22-2, 22-4) access the device cluster 16-2.

Also in the disk control unit 10, resource managers (30-1, 30-2-4) are installed. The resource managers (30-1, 30-2)

manage general resources in the disk control unit 10 and control access requests from host devices.

Figure 3:
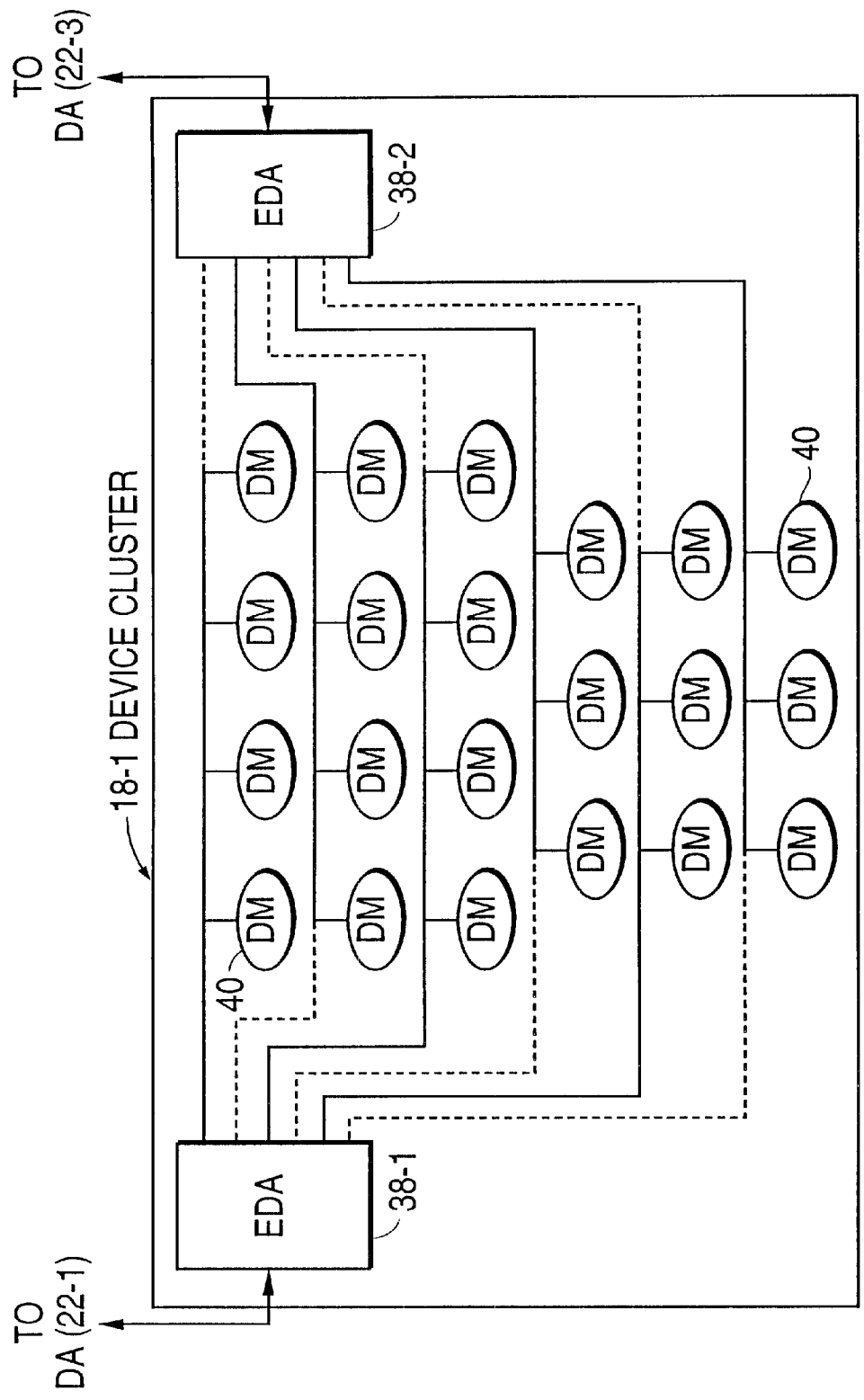
FIG. 3 shows device clusters shown in FIG. 2.

FIG. 3 shows details of the device cluster 16-1 shown in FIG. 2. The device cluster 16-1 is connected to extended device adapters (EDAs) (38-1, 38-2). Three device paths each are extended from the EDAs (38-1, 38-2) and several disk modules 40 are connected to each device path. The disk modules 40 connected to the device cluster 16-1 support the FBA format. For example, the disk modules 40 can access data in units up to the size of a 512-byte physical FBA block.

As for FIG. 2, the operations of each module in the disk control unit 10 are explained briefly as follows. The first channel adapters (18-1, 18-2) are installed between the global server 12 (the first host device) and the device clusters (16-1, 16-2). The first channel adapters (18-1, 18-2) receive CKD-format access commands from the global server and return access processing results to the device clusters (16-1, 16-2).

The second channel adapters (20-1, 20-2) are installed between the open server 14 (the second host device) and the device clusters (16-1, 16-2). The second channel adapters (20-1, 20-2) receive FBA-format access commands from the open server and return access processing results to the device clusters (16-1, 16-2).

The device adapters (22-1–22-4) receive host device access commands from the first channel adapters (18-1, 18-2) and second channel adapters (20-1, 20-2) under the control of the resource manager 30-1. The device adapters (22-1 through 22-4) execute FBA block access commands on device clusters (16-1, 16-2).

In the case of a cache hit, the cache memories (26-1, 26-2) process data on the specified track and return the processing results to the host device. A cache hit means that the cache memories (26-1, 26-2) have specified traffic data when the device clusters (16-1, 16-2) are written or read in accordance with an access command from the global server 12 or open server 14.

When a host device accesses a device cluster (16-1, 16-2) through a cache memory (26-1, 26-2), the track containing the accessed data is partially or totally staged from the device cluster to the cache memory. This staging can be classified into the following types:

(1) Transfer of data to the host system after staging;

(2) Transfer of data to the host system during staging;

(3) Staging after transfer of data to the host system.

However, the present invention minimizes the overhead by executing transfer of data to the host system and staging in parallel.

The disk control unit 10 of the present invention supports access commands from both the global server 12 that uses the CKD format and the open server 14 that uses the LBA format. To permit a CKD-format access command from the global server 12 to an FBA-format device cluster (16-1, 16-2), the disk control unit 10 of the present invention includes a function to convert a CKD-format access command from the host device to an FBA-format access command to the device cluster.

A CKD-format access command from the global server 12 is received by a channel adapter (18-1, 18-2). The channel adapter receives cylinder number CC, head number HH, record number R, and sector number SS indicating the position address of the access command. The FBA format conversion function prepared on the device adapter side (22-1–22-4) converts CKD-format position address CCHHRSS into the first FBA block number as an FBA-format position address.

The first FBA block number obtained by address conversion is sent to the device cluster (16-1, 16-2). By using seek control, the device cluster positions the head at the corresponding track of the disk module 40 matching the CKD-format position address CCHH.

Once the head has been positioned at the track containing the first LBA block number on the disk module 40 of the device cluster (16-1, 16-2) to complete seek control, the track is partially or totally read and staged in the cache memory (26-1, 26-2) as position CKD track data.

Target traffic data developed in the cache memory (26-1, 26-2) can be acquired by calculating the corresponding record position from record number R and sector number SS of data in the CKD format.

For read access, the acquired data is transferred to the global server 12 by the first channel adapter (18-1, 18-2). For write access, the acquired FBA block on the corresponding track of the cache memory is updated with the received write data.

A position address obtained by an access command from the open server 14 is logical block number LBA. In the disk control unit 10 based on the CKD format of the global server 12, the second channel adapters (20-1, 20-2) connecting the open server (14) for LBA-format access use their address conversion function to convert received position address LBA into CKD-format position address CCHH.

Position address CCHH converted by the second channel adapter (20-1, 20-2) is passed to the resource manager (30-1, 30-2). Position address CCHH is passed to one of the device adapters (22-1–22-4) under the control of the resource manager (30-1, 30-2). The device adapter (22-1–22-4) converts the received position address CCHH into the first FBA block number of data in the FBA format and executes seek control for head positioning of the disk module 40 on the device cluster side (16-1, 16-2).

Once seek control has been completed, all data is staged from the target track to the cache memory (26-1, 26-2). The FBA block number corresponding to the record number and the sector number in the record is then known from the address conversion parameters of the first channel adapter (20-1, 20-2). When track data is staged, a read command transfers data from the record position corresponding to the block number to the host device and a write command updates data at the position with received write data.

Figure 4:
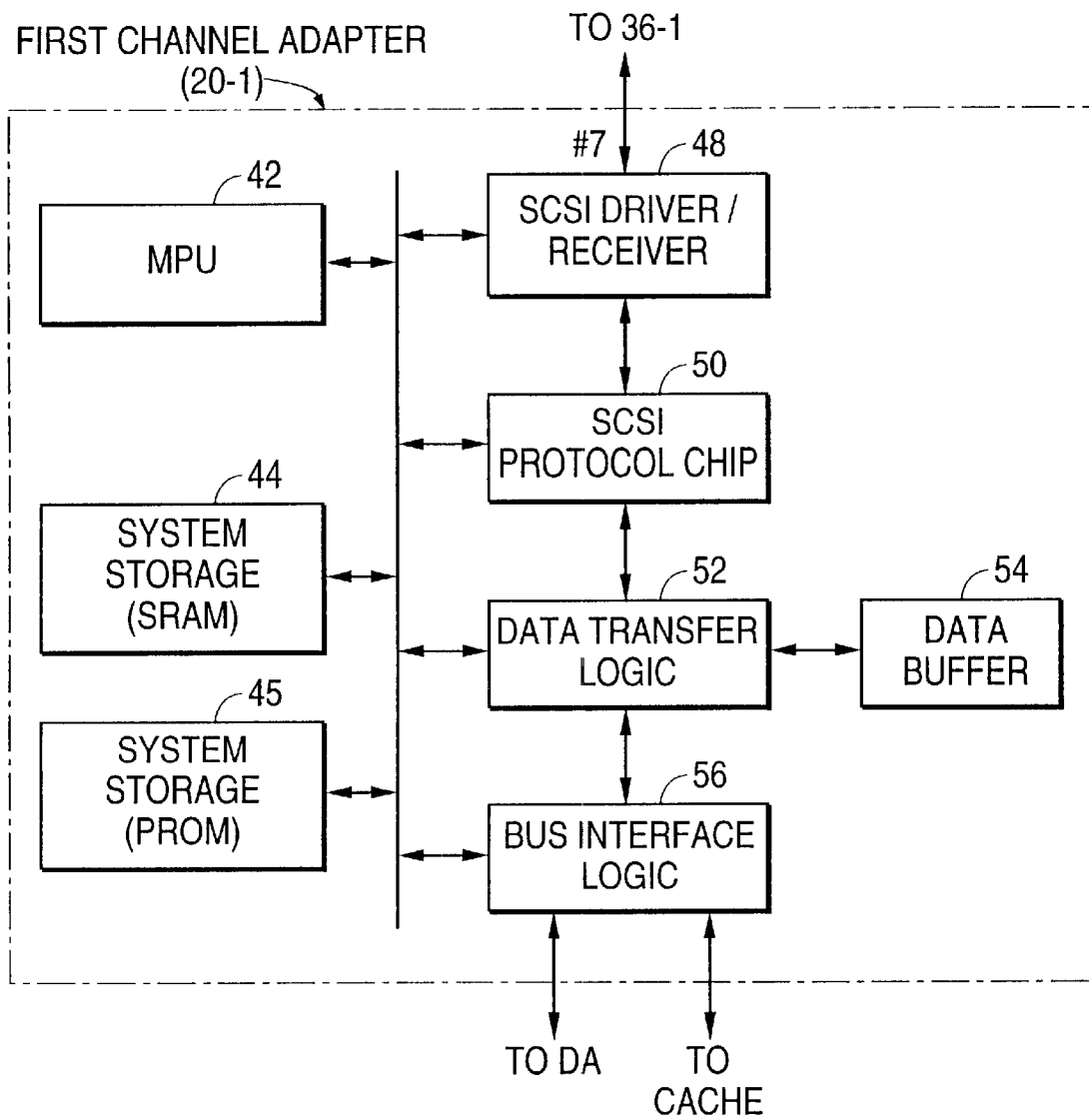
FIG. 4 is a hardware block diagram of the channel adapter shown in FIG. 2.

FIG. 4 shows the hardware configuration of the first channel adapter (20-1) that connects the open server 14 that uses the LBA format shown in FIG. 2. The first channel adapter (20-1) is equipped with an MPU 42, a system storage (SRAM) 44, a system storage (PROM) 45, a SCSI driver/receiver 48 connecting a SCSI interface path to the open server 14, a SCSI protocol chip 50, data transfer logic 52, a data buffer 54, and bus interface logic 56 for device adapter and cache memory interface control. These modules are connected to the MPU 42 through the bus 46.

2. Functional Configuration of the Disk Control Device

Figure 5:
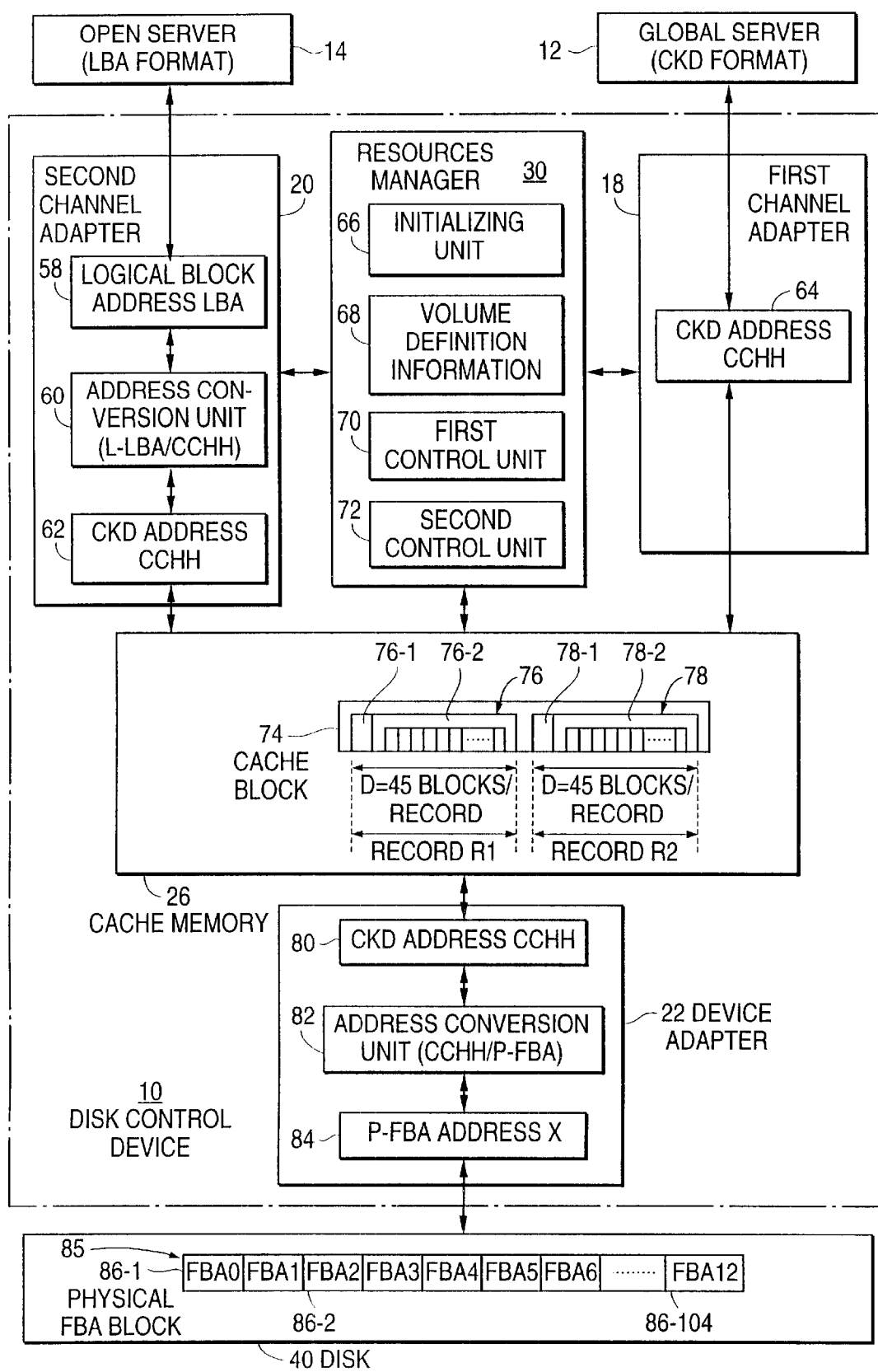
FIG. 5 is a functional block diagram of the present invention.

FIG. 5 is a block diagram of the disk control unit 10 based on the present invention that includes the hardware configuration shown in FIG. 2.

FIG. 5 shows the disk control unit 10 of the present invention, including single modules of the first channel adapter 18, the second channel adapter 20, a device adapter 22, a cache memory 26, and a resource manager 30. The cache function engine controlling the cache memory 26 is omitted and the device cluster (16-2, 16-2) for the device adapter 22 is represented by a single disk module 40. Unlike the dual configuration shown in FIG. 2, this simple configuration makes explanations easy to understand.

The first channel adapter 18 is connected to the global server 12 that accesses the disk module 40 in the CKD format. When CKD address CCHH is received in the queuing register 64 by an access command conforming to the CKD format of the global server 12, the first channel adapter 18 determines by this address CCHH whether access to the cache memory 26 was hit.

If the access to the cache memory 26 was a miss, CKD address CCHH is transferred to register 80 of the device adapter 22 and converted by the address conversion unit 82 to determine the first FBA block number X. X is calculated as follows:

$$X=\{(M-1)\times F+N\}\times E \quad (1)$$

Where,
E: Number of blocks per track (80 blocks)
F: Number of tracks per cylinder (15 tracks)
M: Cylinder number CC
N: Head number HH The first FBA block number X determined by the address conversion unit 82 is stored in register 84. Then X is reported to the disk module 40 as a seek command parameter. By using seek control, the disk module positions the head at the target track 85 containing the first FBA block number X. Once the disk module 40 has completed seek control for the target track 85, all data is read from the target track 85 and developed and stored in the cache memory 26 as a cache block 74.

The cache block 74 developed in the cache memory 26 conforms to the format data set that was used to format the disk module 40 by the initializing unit 66 of the resource manager 30. In this form of execution, this cache block includes two records R1 (76) and R2 (78). Record R1 (76) includes a count section (76-1) and a data section (76-2).

If the physical FBA block size of the disk module 40 is 512 bytes, the data section (76-2) has a 23-Kbyte block area equal to 45 blocks.

The second record section 78 also includes a count section (78-1) and a data section (78-2). The data section has a 23-Kbyte block area including 40 of the 512-byte physical FBA blocks. The format of the CKD track divided into FBA blocks in the cache block 74 will be described in detail later.

The cache block 74 corresponds to the FBA track 85 of the disk module 40 and the FBA track 85 includes 104 of the 512-byte physical FBA blocks (86-1 through 86-104).

As for the cache block 74 staged from the disk module 40 to the cache memory 26 in accordance with CKD address CCHH from the global server 12, sector number S has been obtained as a CKD-format access command. Therefore, the first block number Y to be accessed can be calculated as follows:

$$Y=S\times(K/L) \quad (2)$$

Where,
S: Sector number
K: Logical FBA block size (4,096 bytes)
L: Physical FBA block size (512 bytes)

To support CKD-format access from the global server 12, the resource manager 30 is equipped with the first control unit 70. When CKD-format position address CCHH is received from the global server 12, the first control unit 70 determines the first FBA block number of the disk module 40 corresponding to the position address CCHH by using the address conversion unit 82 of the device adapter 22. Then the first control unit 70 reads the target track 85 of the disk module 40 indicated by the first FBA block number X and stages the data in the cache memory 26, as is the case with the cache block 74.

The first control unit 70 uses expression (2) to further calculate FBA block number Y corresponding to sector number S specified by the CKD-format access command on the cache memory 26. The first control unit 70 transfers the block data to the global server 12 through the first channel adapter 18 for a read command or updates the corresponding block with the data received from the global server 12 for a write command.

If an arbitrary cache block 24 is changed in the cache memory 26, the data is written back to the disk module 40 of the updated cache block 74.

For FBA-format disk access, the open server 14 is connected to the second channel adapter 20. If logical block address LBA is received at the register 58 as a position address by an access command from the open server 14, the address conversion unit 60 converts the logical block address LBA into CKD address CCHH corresponding to the position address obtained by using an access command of the global server 12.

The address conversion unit 60 converts logical block address LBA into CKD address CCHH as explained below. First, the address conversion unit 60 converts logical block address LBA received from the open server 14 into physical block address FBA corresponding to the physical FBA block of the disk module 40. The address is converted as follows:

$$A=B\times(D/C) \quad (3)$$

Where,
A: Physical block address (PBA)
B: Logical block address (LBA)
C: Physical block size (512 bytes)
D: Logical block size (512 bytes)

In this form of execution, physical block size C and logical block size D are both 512 bytes. Therefore, logical block address B can be used as physical block address A with no changes.

If a physical block address is obtained from a logical block address, the address conversion section 60 calculates value M of CKD address cylinder number CC as follows:

$$M=\{A+E\times(F+1)\}/(E\times F) \quad (4) \ldots \text{Quotient } G \text{ and remainder } H$$

Where,
A: Physical block address (PBA)
E: Number of blocks per track (80 blocks)
F: Number of tracks per cylinder (15 tracks)
M: Cylinder number CC Then the address conversion unit 60 calculates value N of CKD address head number HH using remainder H of expression (4) as follows:

$$N=(H/E) \quad (5) \ldots \text{Quotient } I \text{ and remainder } J$$

Where,
E: Number of blocks per track (80 tracks)
N: Head number HH

CKD address CCHH=MN obtained by the address conversion unit 60 is held in the register 62. Then CKD address CCHH=MN is sent to a cache function engine not illustrated here, under the control of the resource manager 30 to determine whether access to the cache memory 26 was a hit.

If access to the cache memory 26 is determined to be an unsuccessful hit (i.e., a miss), CKD address CCHH=MN is sent from the register 62 to the register 80 of the device adapter 22. The address conversion unit 82 calculates the first FBA block number X using expression (1) and sets the block number in the register 84 to send it to the disk module 40. This executes seek control to position the head at the track 85 containing the first FBA block number X. After the seek control is executed, track data is read from the track 85 and staged to the cache memory 26 as the cache block 74.

Since the numbers of blocks in record R1 (76), record R2 (78), and data sections (76-2, 78-2) are fixed, the positions of an access record in the cache block 74 staged to the cache memory 26 and a block in the record can be calculated uniquely from remainder J that was obtained when the address conversion unit 60 calculated value N of head number HH in address conversion. The acquisition of a record number and a block number from the cache block 74 will be described in detail later.

To support FBA-format access from the open server 14 to the second channel adapter 20, the resource manager 30 is equipped with the second control unit 72.

When FBA-format position address LBA is received from the open server 14 as a command parameter, the address conversion unit 60 acquires CKD-format position address CCHH. The second control unit 72 determines the first FBA block number X of the disk module 40 corresponding to the position address CCHH by using the address conversion unit 82 of the device adapter 22. Then the second control unit 72 reads the target track 85 containing the first FBA block number X and stages the data in the cache memory 26.

From the cache memory 26, the second control unit 72 determines a block number in a record corresponding to logical block number LBA specified by the open server 14. Then the second control unit 72 transfers the block data to the open server 14 for a read command or updates the corresponding block with the received write data for a write command.

If a cache hit occurs with CKD address CCHH=MN obtained by the address conversion unit 60, the second control unit 72 executes read transfer or write update on the hit cache block 74.

The resource manager 30 also includes an initializing unit 66. The disk control unit 10 based on the present invention converts the CKD format of the global server 12 internally into the FBA format of the disk module 40 for access processing.

To start operating the disk control unit 10, the initializing unit 66 of the resource manager 30 receives an initialize command from the global server 12 and formats the tracks of the disk module 40. For this initialize processing, the data set that uses the track format as shown in the cache block 74 of the cache memory 26 is used.

When writing each track of the disk module 40 into the cache block 74, the initializing unit 66 formats the track in volumes determined by the logical address of the CKD format with reference to the volume definition information 68 predefined in the resource manager 30. In this example of execution, a track includes two records and each record is divided into 45 blocks.

3. Track Format

Figure 6:
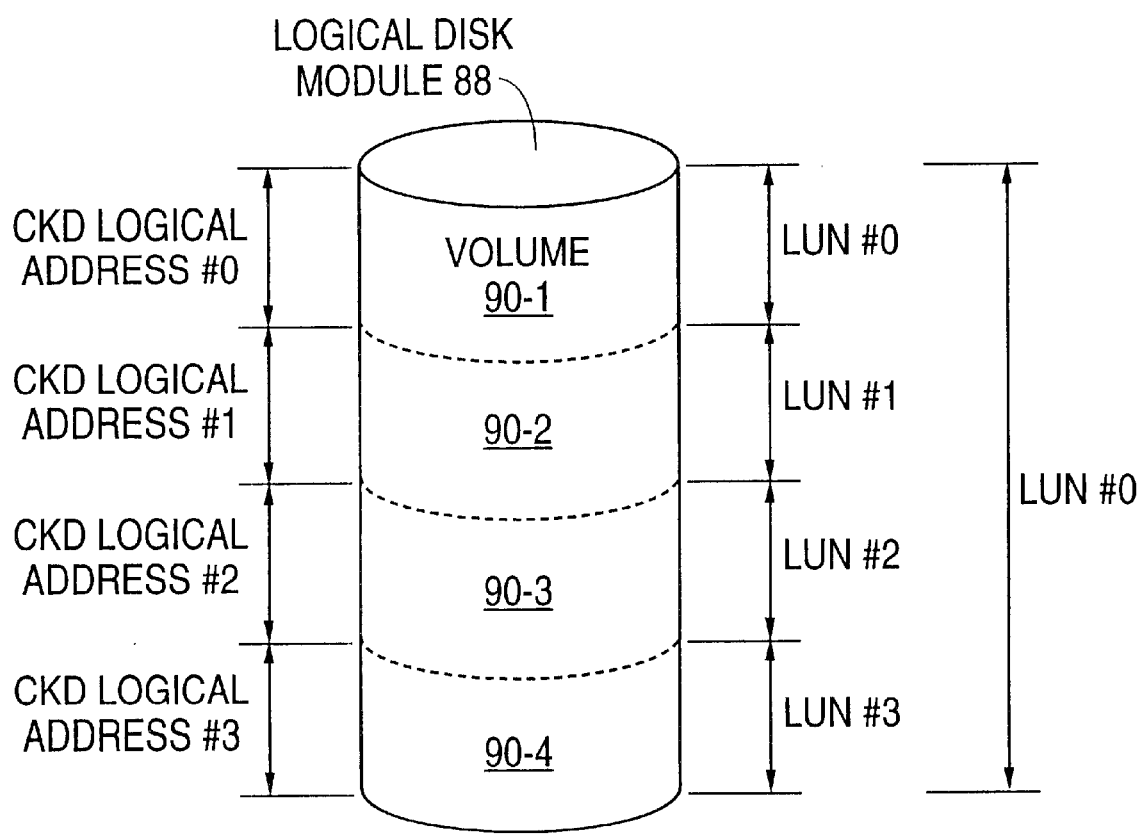
FIG. 6 is a volume configuration of a logical disk module from the viewpoint of a host device.

FIG. 6 shows the relationship between a logical FBA disk and a logical CKD disk. More particularly, FIG. 6 shows the volume configuration of the logical disk module 88 realized by the device clusters (16-1, 16-2) from the viewpoint of the CKD-format global server 12 and the LBA-format open server 14.

For example, the logical disk module 88 includes 48,000 logical tracks divided into four modules (or volumes) (90-1 through 90-4) of 12,000 logical tracks with CKD logical addresses 0 to 3.

The global server 12 shown in FIG. 5 initializes and accesses each module (90-1 through 90-4) with a CKD logical address from 0 to 3, as a single logical disk module, using the processing compatible with the CKD format.

In this form of execution, the open server 14 also includes modules (90-1 through 90-4) of 12,000 logical tracks with SCSI logical addresses (LUNs) 0 to 3. Therefore, the logical FBA disk and logical CKD disk may be in a one-to-one ratio (as shown in FIG. 6 with LUNs 0 to 3 corresponding, respectively, to volumes 90-1 to 90-4).

For another volume configuration, the modules (90-1 through 90-4) can be handled as a single volume by allocating SCSI logical address 0 only. Therefore, the logical FBA disk may be equivalent to 4 logical CKD disks (as shown in FIG. 6 with only LUN 0 (shown on the right side of FIG. 6) corresponding to all of volumes 90-1 to 90-4).

The volume relationship between the CKD and SCSI logical addresses of the logical disk module 88 are stored as the volume definition information 68 of the resource manager 30 as shown in FIG. 5.

Figure 7A:
FIGS. 7(A), 7(B), and 7(C) show volume definition information placed in the resources manager shown in FIG. 5.
Figure 7B:
Figure 7C:

FIGS. 7(A) through 7(C) show an example of volume definition information. In FIG. 7(A), the CKD and SCSI logical addresses of FIG. 6 have one-to-one correspondence. The volume definition information 68-2 in FIG. 7(B) shows that CKD logical addresses 0 to 3 in FIG. 6 correspond to SCSI logical address 0. The volume definition information 68-3 in FIG. 7(C) shows that CKD logical addresses 0 and 1 correspond to SCSI logical address 2 and CKD logical addresses 2 and 3 correspond to SCSI logical addresses 1 and 2.

By referencing the volume definition information 68, the initializing unit 66 of the resource manager 30 shown in FIG. 5 formats a track using a specified data set for each volume determined by the CKD logical address defined in the information 68. If the volume definition information 68-1 shown in FIG. 7(A) is set, a track is formatted for each volume (90-1 through 90-4) in FIG. 6, determined by a CKD logical address from 0 to 3.

Figure 8:
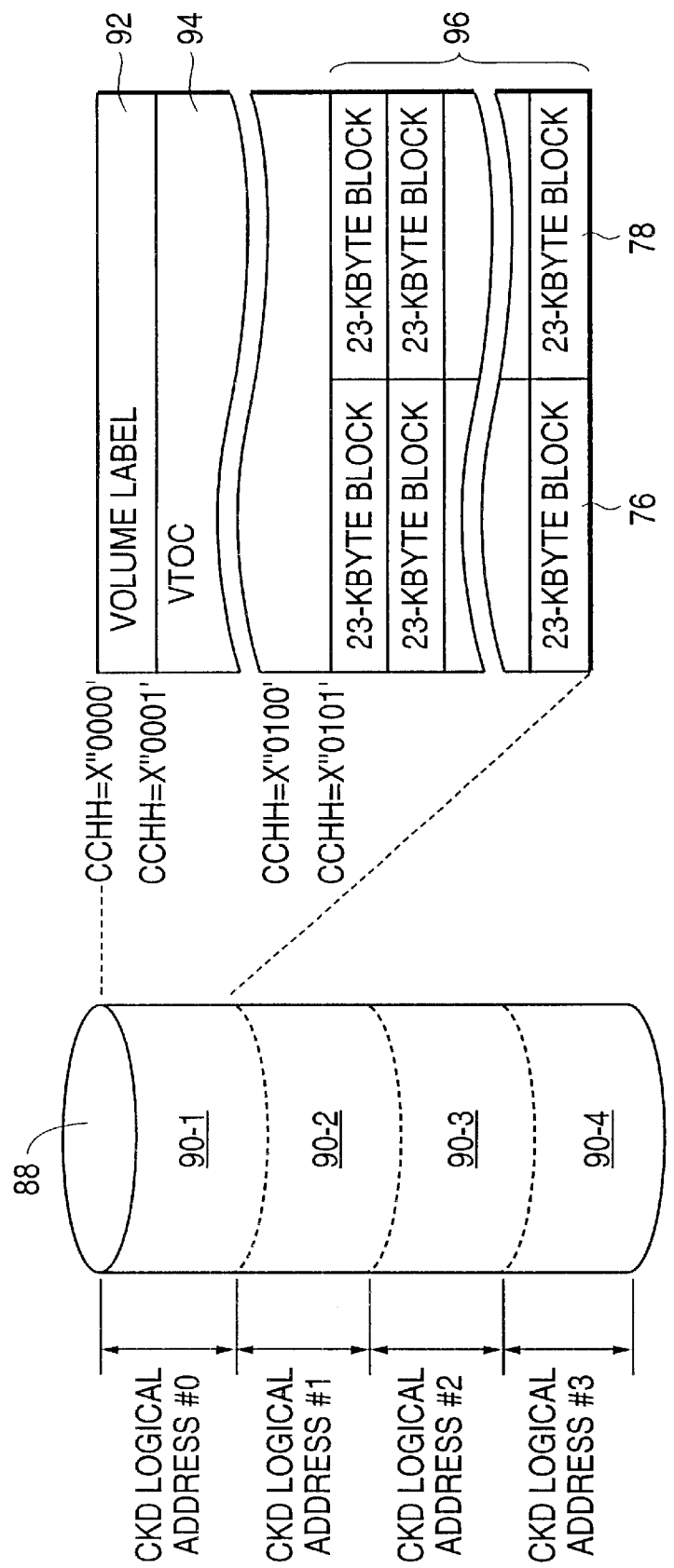
FIG. 8 is a logical disk module initialized into the CKD format by volumes.

FIG. 8 shows the initialize processing using the format of each volume (90-1 through 90-4) corresponding to CKD logical address 0 to 3 of the logical disk module 88. In FIG. 8, volume 90-1 of CKD logical address 0 is initialized. When the volume 90-1 is initialized, volume label 92 is allocated to the first position address CCHH=X'0000' and the volume table of contents (VTOC) 94 to the next position address CCHH=X'0001' to X'0100.'

The volume table of contents 94 includes information on files contained in the volume 90-1 and available blank areas. The remaining tracks from position address CCHH=X'0101' form the format area 96. A CKD track is formatted into spaces covering two records of 23-Kbyte block each.

FIGS. 9(A) through 9(C) compare the formats of a CKD track 98 in the global server 12, a logical FBA track 100 in the disk control unit 10, and a physical FBA track 102 in the disk module 40 shown in FIG. 5.

FIG. 9(A) shows a CKD track 98 accessed by the global server 12. The track 98 includes an index, home address HA, record R0, record R1 headed by count section R1C, and record R2 headed by count section R2C.

FIG. 9(B) shows a logical FBA track that uses the cache block 74 format developed in the cache memory 26 of the disk control unit 10. The logical FBA track 100 developed in the cache memory is divided into logical FBA blocks (104-1 through 104-13) of a specified block size. Each block (104-1 through 104-13) begins with a COF-conversion ID 106. The CKD track 98 shown in FIG. 9(A) is divided and allocated to the area of the logical FBA track 100, excluding the COF-conversion ID 106, as indicated by the broken lines.

FIG. 9(C) shows a physical FBA track 85 of the disk module 40. For example, the physical FBA track 85 is divided into 104 of the 512-byte physical FBA blocks (86-1 through 86-104). Eight physical FBA blocks on this physical FBA track 85 correspond to one logical FBA block (104-1 through 104-13) on the logical FBA track 100 shown in FIG. 9(B). The relationships are as follows:

Logical FBA track (104)=8×physical FBA block

=8×512 bytes

=4,096 bytes

FIG. 10 shows details of the CKD track 98 shown in FIG. 9(A). The CKD track 98 includes home address HA after index mark Index indicating the track start position. Home address HA is an area in which track address CCHH is described. After home address HA, record R0 is prepared for the system program.

Record R0 includes count area C and data area D. Then records R1 and R2 are attached. Records R1 and R2 are user areas, each including count area C, key area K, and data area D. The CKD track 98 based on the present invention includes two records, R1 and R2; data area D has a fixed block length of 23 Kbytes.

Records R1 and R2 provides cylinder number CC, head number HH, record number R, key area data length K, and length DD of data area D in count section C. A host device that uses the CKD format can access individual records by specifying track address CCHH and record number R. The key area may be omitted.

FIGS. 11(A) and 11(B) show the correspondence between the CKD track 98 shown in FIG. 10 and the logical FBA track 100 developed in the cache. The logical FBA track 100 in FIG. 11(B) corresponding to the CKD track 98 in FIG. 11(A) is divided into 13 of the 4096-byte logical blocks (104-1 through 104-13). The first 64 bytes of each logical FBA block (104-1 through 104-13) are allocated to a COF-conversion ID 106 and a CKD track 98 is divided and placed in the remaining 4,032 bytes.

Figure 12:
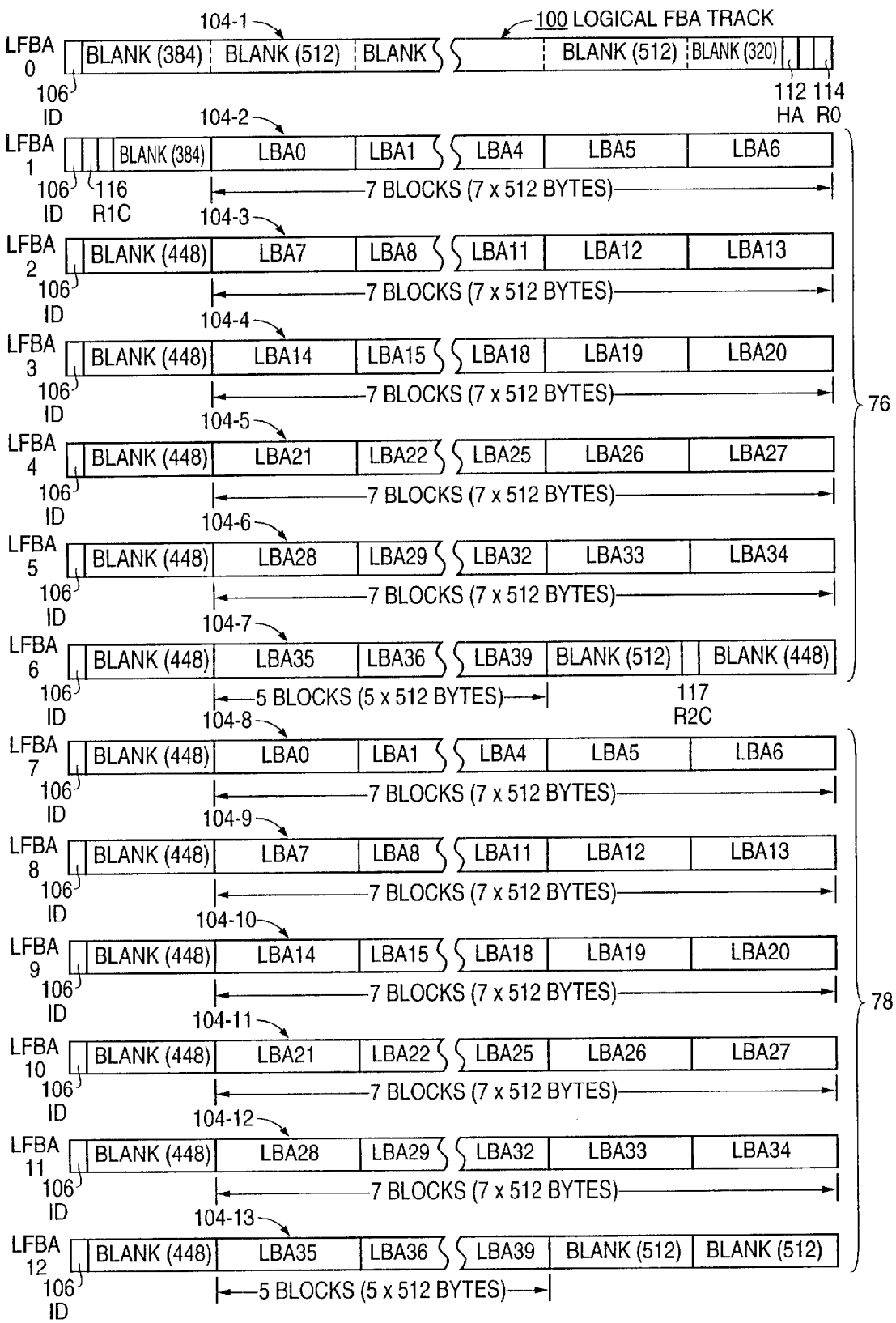
FIG. 12 shows a detailed format of the logical FBA track of the present invention when the CKD track of the present invention is divided by FBA blocks.

FIG. 12 shows details of the logical FBA track 100 shown in FIG. 11(B). In FIG. 12, the logical FBA track 100 includes 13 of the 4096-byte logical FBA blocks (104-1 through 104-13) lined vertically. Each logical FBA block (104-1 through 104-13) can be divided into eight 512-byte physical FBA blocks in the disk module 40.

Figure 13:
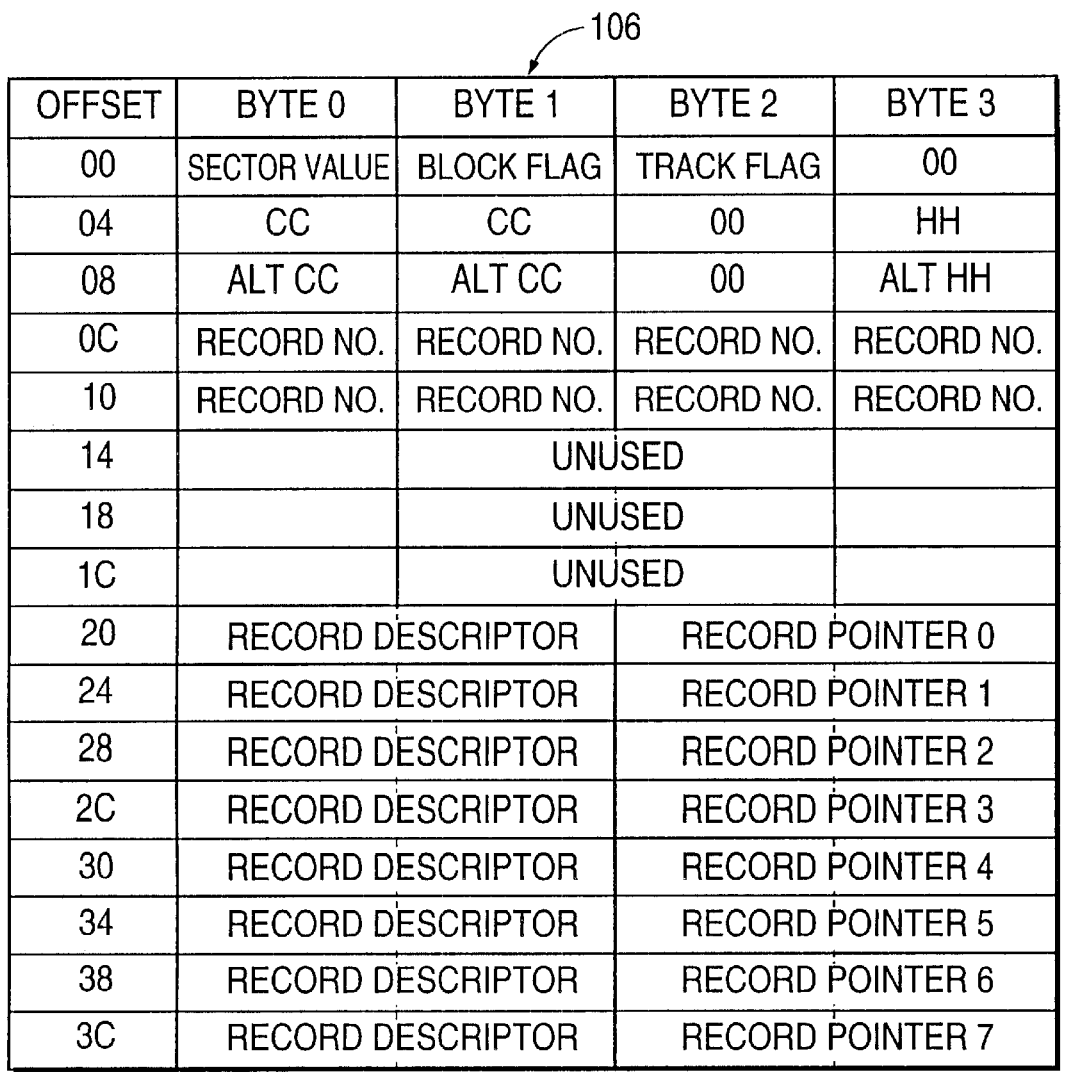
FIG. 13 shows ID information at the beginning of the logical FBA block shown in FIG. 12.

Each logical FBA block (104-1 through 104-13) begins with a 64-byte ID 106 for COF conversion. The ID 106 describes the contents shown in FIG. 13. The contents is summarized as follows:

Sector Value
This area indicates the first sector value of the CKD track stored in the logical FBA block.

Block Flag
This area stores the unique information on the logical FBA block, such as the presence or absence of effective records.

CCHH
This area stores logical address CCHH of the logical FBA block on the CKD track.

ALT CCHH
This area stores logical address CCHH of an alternative or defective CKD track.

Record No.
This area stores the control numbers of records existing in the logical FBA block.

Record Descriptor
This area stores the information on records existing in the logical FBA block.

Record Pointer
This area stores the number of bytes from the beginning of CKD track data (CCHH) stored in the logical FBA block until count home address HA/end of track EOT.

In FIG. 12, the home address 112 and record R0 (114) of the CKD track 98 are allocated in the first logical FBA block (104-01) from the back. Record R1 (76) of the CKD track is allocated in logical FBA block 2 (104-2) to logical FBA block 7 (104-7).

To record R1 (76), 40 blocks are allocated as indicated by physical LBA block numbers LBA0 to LBA39. The data size is 512 bytes×40 blocks=20,480 bytes=20 Kbytes. In record R1 (76) of 40 blocks, the first 64 bytes of each logical FBA block (104-2 through 104-7) are allocated to a COF-conversion ID 106. As for the logical FBA block (104-2), 64 bytes are also reserved for record R1 count R1C (116).

Therefore, the first 512-byte area is left blank with no record R1 (76) allocated and block areas are allocated in the rest (7-7-7-7-5 blocks). The last logical FBA block (104-7) of record R1 (76) is completed with five blocks of block numbers LBA35 to LBA39. The next 512-byte area is left blank and record R1 count R2C (117) of record R2 (78) is placed in the first 64-byte area of the last block.

As with logical FBA blocks 8 to 13 (104-8–104-13), 40-block data of record R2 (78) is allocated from the back for block numbers LBA0 to LBA39. The last two blocks of the last logical FBA block (104-13) for record R2 (78) are left blank.

Consequently, the 40 blocks of record R1 (76) and the 40 blocks of record R2 (78) in the logical FBA block 100 are allocated each to six logical FBA blocks (104-2 through 104-7, 104-8 through 104-13) with equal positional relationships. If only a record can be identified as R1 or R2, its block positions can be acquired uniquely by the same algorithm.

FIGS. 14(A) and 14(B) show details of the correspondence between the logical FBA track shown in FIG. 12 and the physical FBA track 85 in the disk module 40.

FIG. 14(A) shows the first logical BA block (104-1) extracted from the logical FBA block 100 shown in FIG. 12. The physical FBA track 85 on the disk module 40 shown in FIG. 14(B) includes an ID 110 and 512-byte physical FBA blocks (86-1 through 86-8). The ID placed before the eight physical FBA blocks (86-1 through 86-8) describes a block number for identifying the physical FBA blocks.

Figure 15A:
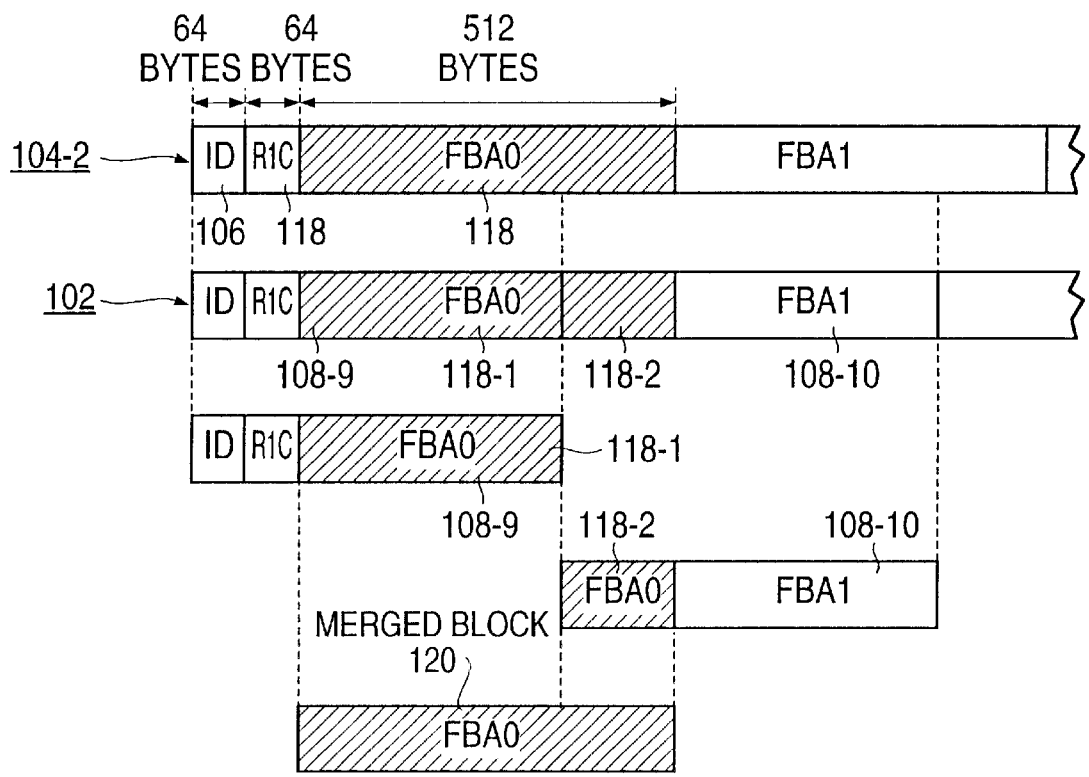
FIGS. 15(A) and 15(B) show record placement in the logical FBA block of the present invention to avoid merging.
Figure 15B:
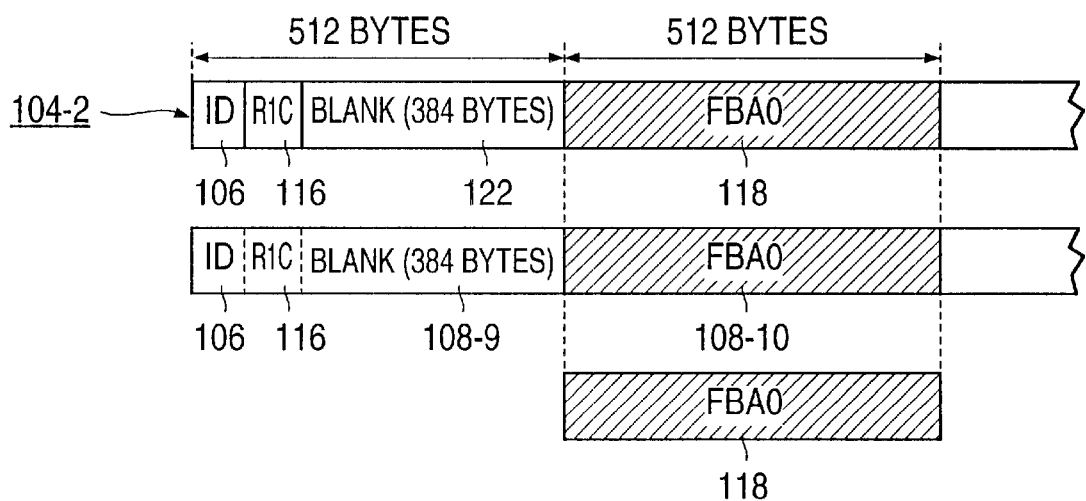

FIGS. 15(A) and 15(B) explain the feature of canceling merge in the cache. This example of execution permits 512-byte access to the disk module 40 by reserving 40 blocks in each logical FBA block (104-2 through 104-13) from the back on the logical FBA track 100 of FIG. 12 for the data of record R1 (76) and record R2 (78).

In FIG. 15(A), the second logical block (104-2) is not allocated from the back as in FIG. 12. After a 64-byte ID 106 for COF conversion and 64-byte record R1 count R1C (116), a 512-byte block 118 of block number FBA0 is allocated.

As the physical FBA track 102 shows, the block 118 is divided into partial blocks (118-1, 118-2) for the first 512-byte physical FBA block (108-9) and the next 512-byte physical FBA block (108-10).

To acquire a block 118 in the cache by using physical FBA block access, the first physical FBA block (108-9) is read first and the second physical FBA block (108-10) next. These blocks are merged with partial blocks (118-1, 118-2) to obtain a merged block 120. Since physical FBA block access requires merge processing, the access performance goes down.

FIG. 15(B) shows placement from the back based the present invention. As for the first 512-byte block of the logical FBA block (104-2), a COF-conversion ID 106 and record R1 (116) are assigned and the remaining 384 bytes are reserved as a blank area 122. To the next 512-byte block, block data 118 of block number FBA0 is allocated.

The logical FBA block (104-2) having block data 118 allocated from the back is arranged for one-to-one correspondence with 512-byte physical FBA blocks (108-9, 108-10) on the physical FBA track of the disk module 40. Therefore, block data 118 on the physical FBA track 102 can be accessed without merge processing.

On the logical FBA track 100 shown in FIG. 12, the CKD format is substantially divided by the 512-byte physical FBA blocks of the disk module. If the global server 12 is removed as the disk control unit 10 in FIG. 2 to process only FBA-format access from the open server 14, the CKD format can be changed to the FBA format of 104 blocks 104 only by eliminating the home address 112, record R0 (114), record R1 count (116), and record R2 count (117) unique to the CKD format from those in FIG. 12.

The format shown in FIG. 12 ensures extremely high matching even when shared or used independently for the CKD format and FBA format.

4. Initializing, Operation, and Backup

Figure 16:
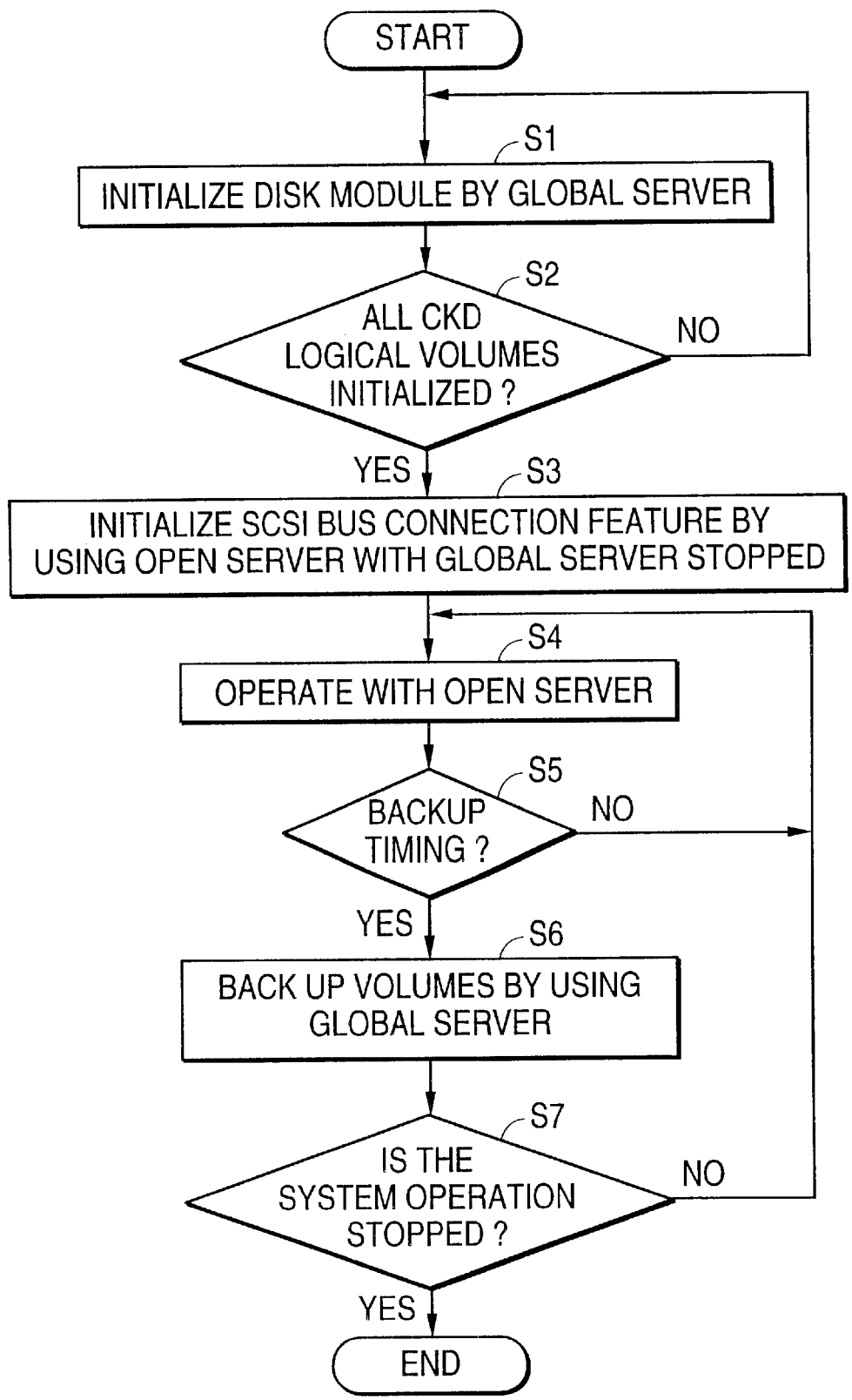
FIG. 16 is an operational flowchart using the disk control device of the present invention.

FIG. 16 shows a flowchart allowing the CKD-format global server 12 and LBA-format open server 14 to share a disk module 40 connected through the disk control unit 10 based on the present invention as shown in the functional block diagram of FIG. 5.

In this form of operation, the open server 14 accesses the disk control unit 10 for daily transactional work. Meanwhile, the global server 12 initializes the disk module 40 and backs up data generated on the disk module 40 by using the open server 14.

In the flowchart of FIG. 16, the global server initializes the disk module 40 before the start of operation at step S1. To initialize the disk module, the global server 12 issues an initialize command for CKD track formatting to the first channel adapter 18 of the disk control unit 10.

When initializing the disk module 40 by using the global server 12, the open server 14 should be stopped to prevent access from the open server 14 to the disk control unit 10.

When an initialize command is received from the global server 12, the disk control unit 10 activates the initializing unit 66 of the resource manager 30. By referencing the volume definition information 68, the initializing unit 66 recognizes that the logical disk module 88 is divided into four volumes (90-1–90-4) as shown in FIG. 8 and starts initializing the volume (90-1) of CKD logical address 0 first.

For the volume (90-1) shown in FIG. 8, this initialization process generates a volume label 92 and a volume table of contents 94 as shown on the right-hand side of FIG. 8. Then the disk module 40 is written in tracks by using the track format data set of the logical FBA track shown in FIG. 12. This write processing generates a CKD track divided by 23-byte logical FBA blocks of record R1 (76) and record R2 (78).

Then, the initialization of all CKD logical volumes is confirmed at step S2 shown in FIG. 16. Once the completion of all-volume initialization has been recognized, the processing advances to step S3. When the global server 12 is stopped in FIG. 5, the open server 14 initializes the SCSI bus connection mechanism and starts daily work at step S4.

During operation, the open server 14 checks the global server 12 backup timing at step S5. A 24-hour operation schedule sets the backup start time in specified hours at night when access from the open server 14 is suspended.

The open server determines what the timing of the backup start time should be and advances to step S6.

At the step S6, the global server 12 is activated if inactive and turned online if offline. The open server issues a backup command to the disk control unit 10, transfers data from the disk module 40 to the global server 12 in units of volume, and writes the volume data into a backup device, such as a magnetic tape or optical disk unit connected to the global server 12, as an external device.

In backup processing at step S6, the disk control unit backs up data in units of volume by referencing the volume definition information 68 with SCSI logical addresses LUN0 to LUN3 that are the units of volume on the open server 14.

For example, the volume definition information (68-1) shown in FIG. 7(A) has one-to-one correspondence between CKD and SCSI logical addresses. In this case, the volumes (90-1–90-4) shown in FIG. 6 are preferably backed up independently. If SCSI logical address 0 is allocated to CKD logical addresses 0 to 3 to define the volumes as a single volume as is the case with the volume definition information (68-2) shown in FIG. 7(B), SCSI logical address 0 is preferably backed up from the open server (14) as a single unit. In this case, the volumes (90-1 to 90-4) of CKD logical addresses 0 to 3 are preferably backed up in the global server (12) as a single volume.

At step S6 in FIG. 16, volume backup by the global server 12 is completed. At step S7, the disk control unit 10 checks whether to stop the system operation. To continue the system operation, the disk control unit 10 returns to step S4 and restarts the operation with the open server 14 after shutting down the global server 12 or turning it offline.

5. Cache Control

In FIG. 5, the global server 12 is shut down or turned offline after initializing the disk module 40. The open server 14 is activated to start accessing the system to carry out daily work. Then the disk control unit 10 processes access the system from the open server 14 as explained below.

Figure 17:
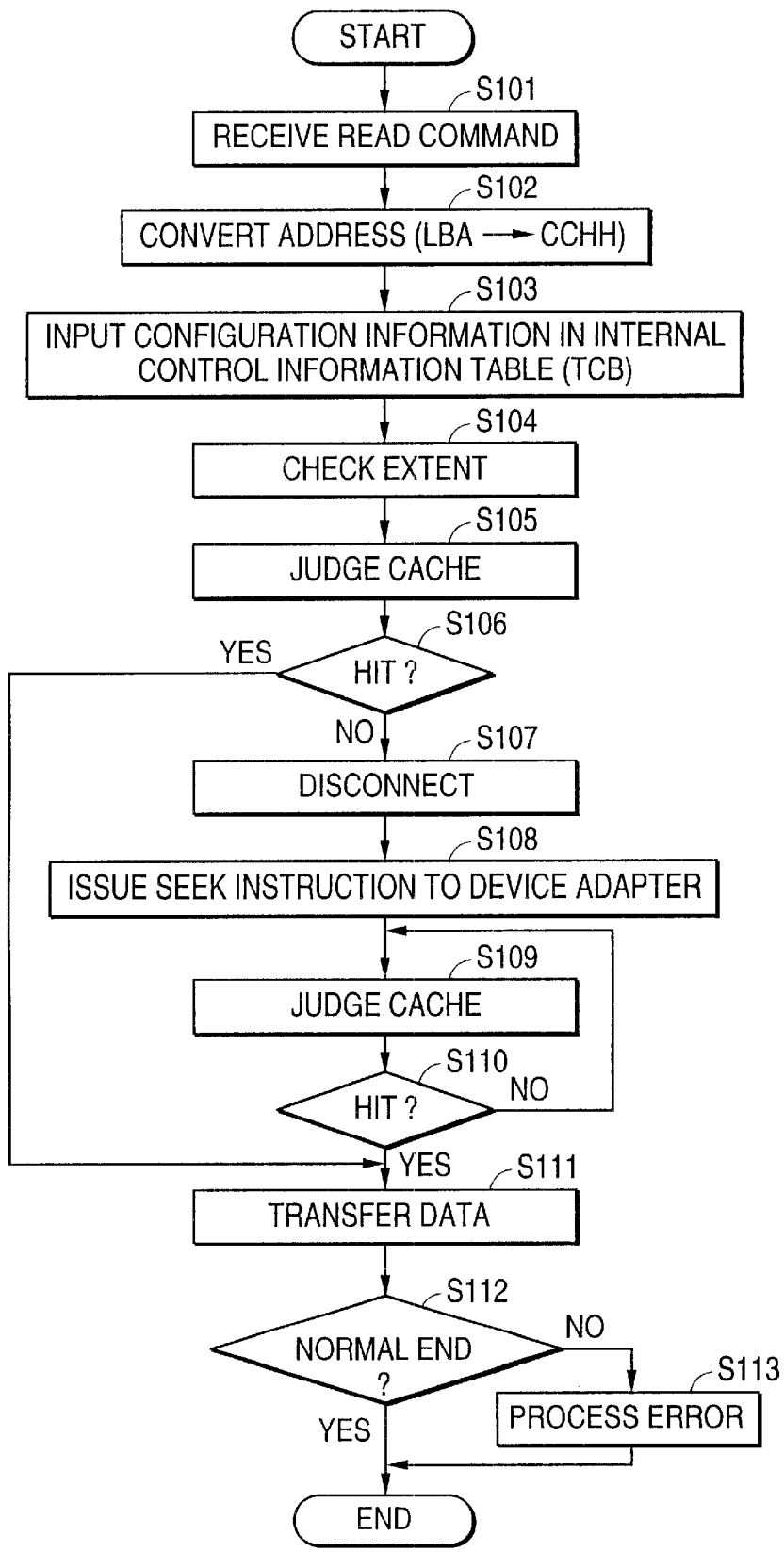
FIG. 17 is a disk control flowchart for access from an open server.

FIG. 17 is a flowchart for read processing when the disk control unit 10 receives a read command from the open server 14. If a data read from the disk module 40 becomes necessary, the open server 14 issues a read command to the second channel adapter 20 of the disk control device 10. This read command is received at step S101.

The read command from the open server 14 contains as its parameters SCSI logical address i indicating the volume, logical block number LBA indicating the first position of the volume of SCSI logical address i, and the requested data block length.

When this read command is received, the second channel adapter 20 adds the command to the command queue and emulates normal command termination for the open server 14, to disconnect the SCSI bus.

At step S102, the second channel adapter 20 converts the received logical block address LBA into CKD-format position address CCHH by using the address conversion unit 60 in accordance with expressions (3) to (5), previously discussed.

The converted position address CCHH and command information is reported to the resources manager 30. The resources manager inputs the configuration information in the internal control table Task Control Block (TCB) in the control storage at step S103.

At step S104, the resources manager 30 checks the extent of file data specified by using the read command. To recognize the continuous area for read file data, the resources manager 30 defines start position address CCHH indicating the start track obtained by address conversion at step S102 and end position address CCHH indicating the end track with the number of tracks determined from the block length.

At step S105, the resources manager 30 passes CKD-format CCHH obtained by address conversion to the cache function engine 28 shown in FIG. 2, with SCSI logical address i indicating the volume and request cache judgment to see whether the data exists in the cache memory 26.

More specifically, SCSI logical address i indicating the volume and position address CCHH are passed to the mapping hardware. A hash pointer is generated to search the hash table where cache control information is stored. If the target data exists in the hash table, the cache judgement results in a cache hit and the cache memory entry address is acquired.

If the entry address cannot be acquired from the hash table, a notice indicating that no match in data was found in the cache is issued to report that the address does not exist in the cache memory 26. The resources manager 30 receives the cache judgment result at step S105. If a cache is judged as a successful hit at step 6, the resources manager 30 advances to step S110. By referencing the cache memory 26 with the entry address obtained by using hit judgment explained above, the resources manager 30 reads a specified block length of data from the corresponding block of the corresponding cache block 74. At step S111, the resources manager 30 transfers the read data to the open server 14 through the second channel adapter 20.

If the target data does not exist in the cache memory 26, the second channel adapter 20 is disconnected from the open server 14 at step S107. At step S108, a seek instruction based on position address CCHH is issued to the device adapter. If a notice indicating no match data found in the cache is received from the cache function engine 28, the resources manager 30 selects a blank device adapter 22 and notifies the second channel adapter 20 of the selection.

On receiving this notice, the second channel adapter 20 disconnects the open server 14. At the same time, to send to the device adapter 22 which is notified by the resources manager 30, the second channel adapter 20 issues a seek command based on the position address CCHH obtained by using the address conversion unit 60. With position address CCHH from the second channel adapter 20, the device adapter 22 determines the first physical FBA block number X in the disk module 40 by using the address conversion unit 82 to calculate with the above expression (1). This block number is reported to the disk module 40 to position the head at the target physical FBA track 85 by seek control.

After completing a seek on the disk module 40, the device adapter 22 issues a read command. Data stored in the target track is read from the disk module 40 and developed in the cache memory 26 as a cache block 74 for staging.

Once track data has been staged from position address CCHH to the cache memory 26, the cache judgment at step S109 results in a cache hit at step S110. Then the second channel adapter 20 issues a connection request to the open server 14. Once the open server 14 has been reconnected, the second channel adapter 20 reads data on a requested block length from the first block among the cache block 74 developed in the cache memory 26. The second channel adapter 20 transfers the read data at step S111 and checks normal termination at step S112 to complete a processing series. If the termination is not normal, a retry or other error processing is executed at step S113.

If the cache judgment at step S106 results in a cache miss, data staging from the disk module 40 to the cache memory 26 and read data transfer to the open server 14 at steps S107 to S111 are actually executed in parallel.

After seeking data with the first physical FBA block number X based on position address CCHH converted by using the address conversion unit 82, the device adapter 22 reads data from the built-in data buffer in units of logical FBA block and develops it in the cache memory 26 while reading the physical FBA blocks of one CKD track and storing them in the built-in data buffer. Each time one logical FBA block of data is stored in the cache memory 26, the completion of storage is written in the cache control table.

The second channel adapter 20 always references the cache control table of the cache memory 26. When one logical FBA block of data is written, the second channel adapter 20 references the COF-conversion ID at the head to determine whether there is a logical FBA block containing the logical block address specified by using the read command of the open server 14. If the logical FBA block exists, the block is read from the cache memory 26 and transferred to the open server 14.

This, accordingly, allows logical FBA block write from the disk module 40 to the cache memory 26 and read data transfer from the cache memory 26 to the open server 14 to be executed simultaneously.

Figure 18:
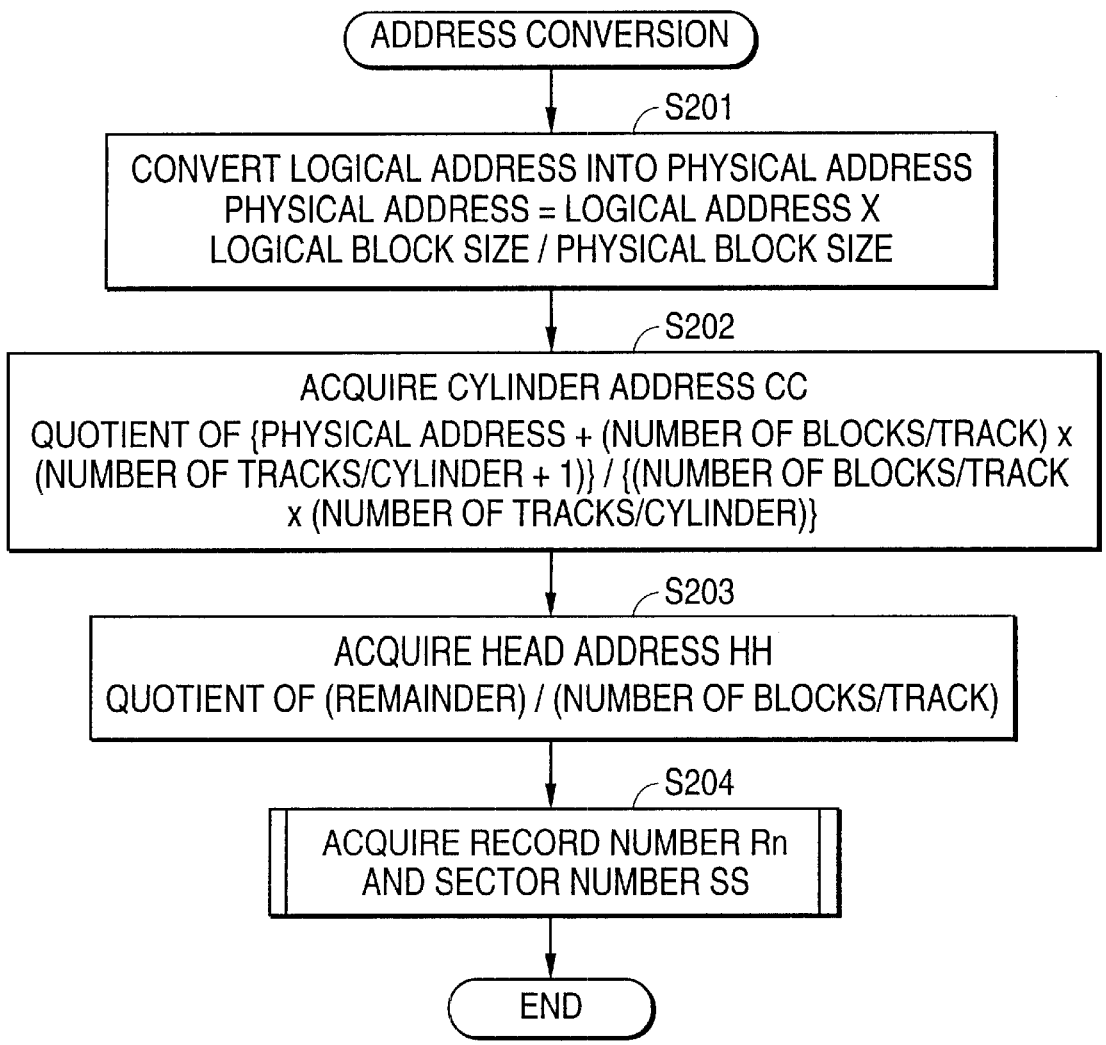
FIG. 18 is an address conversion flowchart for access from an open server.

FIG. 18 shows address conversion processing using the address conversion unit 60 of the second channel adapter 20 in step S102 shown in FIG. 17. This processing converts logical block address LBA of data that uses the FBA format received from the open server 14 as a command parameter into position address CCHH of data that uses the CKD format.

At step S201, the received logical address LBA is converted into a physical block address of the disk module 40 in accordance with expression (3) discussed above. Since both the logical block size and the physical block size are 512 bytes, a logical address can be handled as a physical address with no changes. At step S202, cylinder address CC for data that uses the CKD format is calculated by using expression (4) discussed above.

At step S203, head address HH of data that uses the CKD format is calculated by using expression (5) from cylinder address CC acquired in step S202. By using address conversion at steps S201 to S203, position address CCHH is obtained for staging track data that uses the CKD format from the disk module 40 to the cache memory 26.

By using step S204, one CKD track of data at position address CCHH is read from the disk module 40 in the cache memory. Then record number Rn and sector number SS (block number) corresponding to the logical block address from the open server 14 are acquired.

Figure 19:
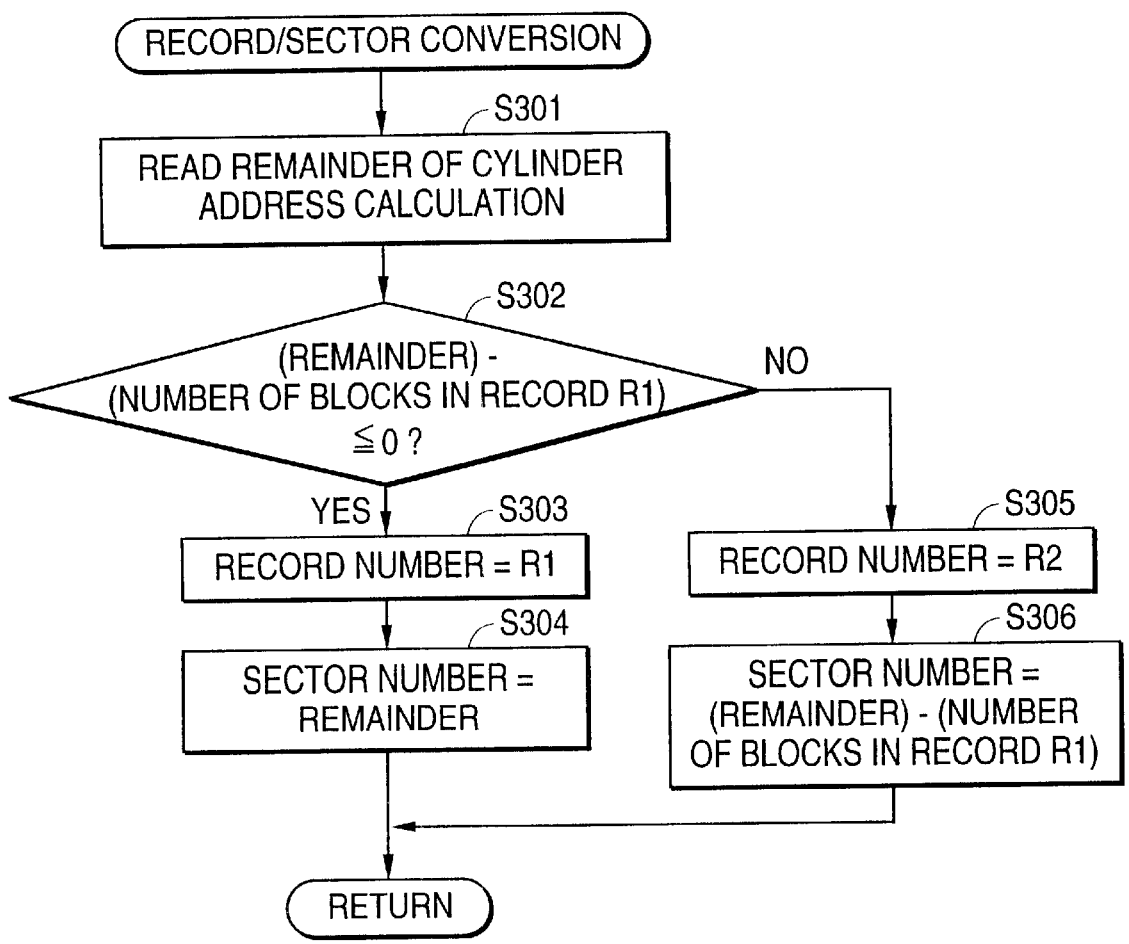
FIG. 19 is a detailed flowchart for acquiring record and sector numbers in FIG. 18.

The subroutine in FIG. 19 shows processing at step S204 of FIG. 18. At step S301, the remainder obtained by acquiring head address HH at step S203 in FIG. 18 is read. At step S302, the number of blocks in record R1 of one CKD track is subtracted from the remainder to check whether the balance is equal to 0 or is negative.

As FIG. 12 shows, record R1 of one CKD track contains 40 physical FBA blocks. Therefore, if the remainder of the cylinder address calculation is below 40 blocks, the blocks exist in record R1. In this case, record number R1 is recognized at step S303. At step S304, blocks are acquired in accordance with the sector number (remainder of the cylinder address calculation at step S301).

If the balance is 1 or more after the number of blocks in record R1 is subtracted from the remainder at step S302, the blocks are included in blocks 41 to 80 of record R2. At step S305, the record number is set to R2. At step S306, the number of blocks=40 in record R1 is subtracted from the remainder to determine the sector number.

Figure 20:
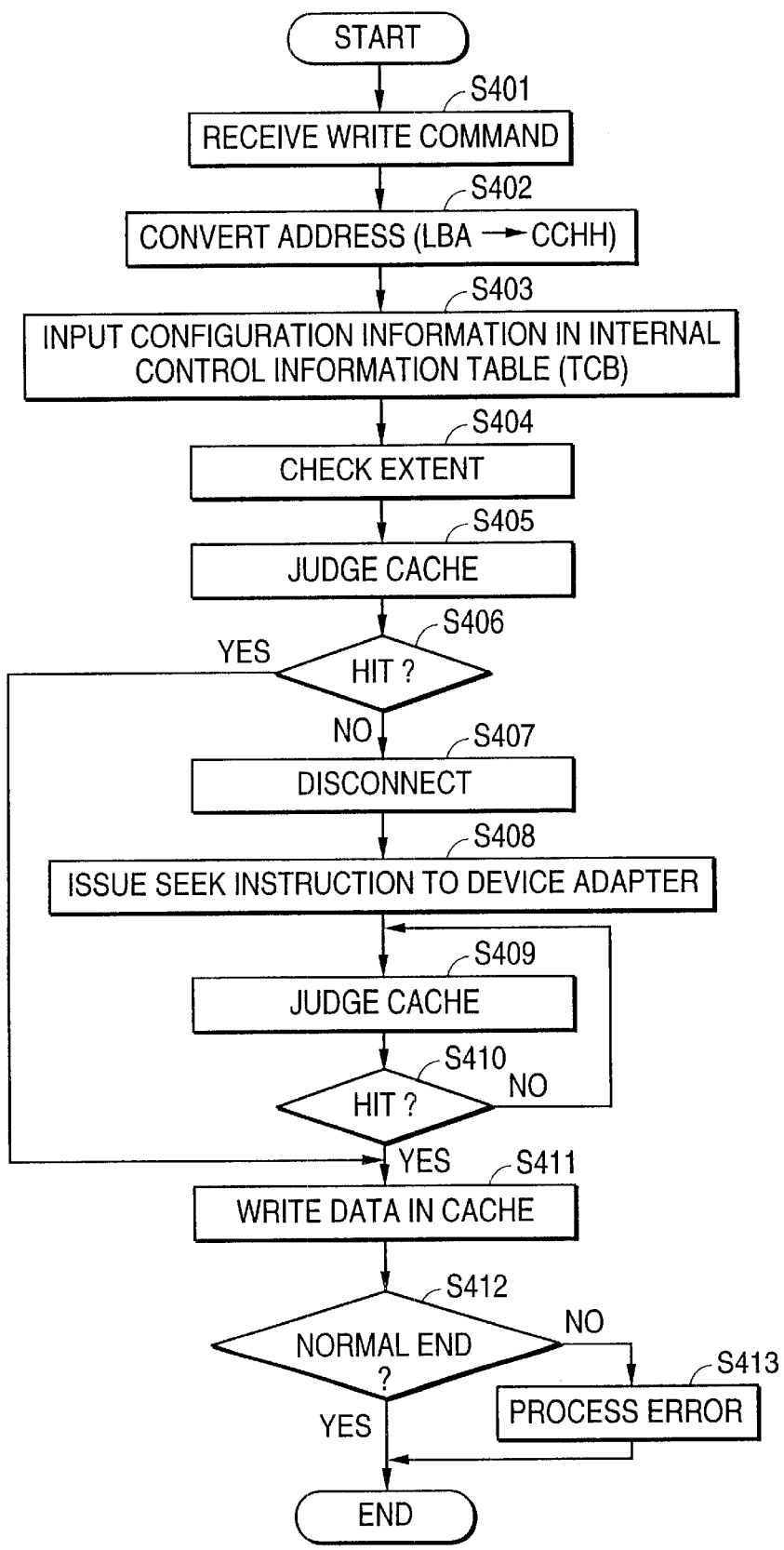
FIG. 20 is a disk control flowchart for write access from an open server.

FIG. 20 is a flowchart showing write processing when the disk control unit 10 receives a write command from the open server 14. If the second channel adapter 20 receives a write command at step S401, logical block address LBA obtained as a command parameter is converted into CKD-format position address CCHH at step S402. At step S403, the resources manager 30 registers the corresponding position address CCHH, command type, and other parameters of the received command in the internal control table. At step S404, the resources manager 30 checks the extent of file data specified by using the write command to recognize the continuous area for the file data.

At step S405, a pointer is generated with SCSI logical address i, position address CCHH, and other command parameters as hush parameters and the hush table is searched for a cache judgment. If the corresponding data exists in the cache memory 26, the cache judgment at step S406 results in a cache hit. At step S411, therefore, data received from the open server 14 is written into the cache memory 26.

If the corresponding data is not found in the cache memory 26 at step S406, the channel adapter 20 is disconnected from the open server 14 at step S407. At step S408, an instruction to seek the disk module 40 for position address CCHH is given to the device adapter 22. The disk module 40 stages the corresponding track data to the cache memory 26.

If the cache is judged at step S409 due to this staging, the cache judgment result at step S410 is a cache hit. Therefore, data transferred from the open server 14 upon a connection request from the second channel adapter 20 is written into the corresponding block of CKD track data in the cache memory 26 at step S411.

At step S411, the end of the data write into the cache memory 26 is checked. If the termination is normal at step S412, the processing series terminates. If the termination is not normal, a retry or other error processing is executed at step S413.

If the write command results in a notice indicating that no match for the data is found in the cache at step S406, CKD track data is staged from the disk module 40 of steps S407 to S411 and data is written. As to this write processing, the channel adapter checks the CF-conversion ID each time one logical FBA block is developed in the cache memory 26. If the corresponding block is found, its data is written to stage data from the disk module 40 to the cache memory 26 and data from the channel adapter 20 is written to the staged logical FBA block in parallel.

If the cache judgment results in a cache hit at step S406 and data is written into cache memory 26 as shown in FIG. 20, the write-back flag at the cache control table is on.

Figure 21:
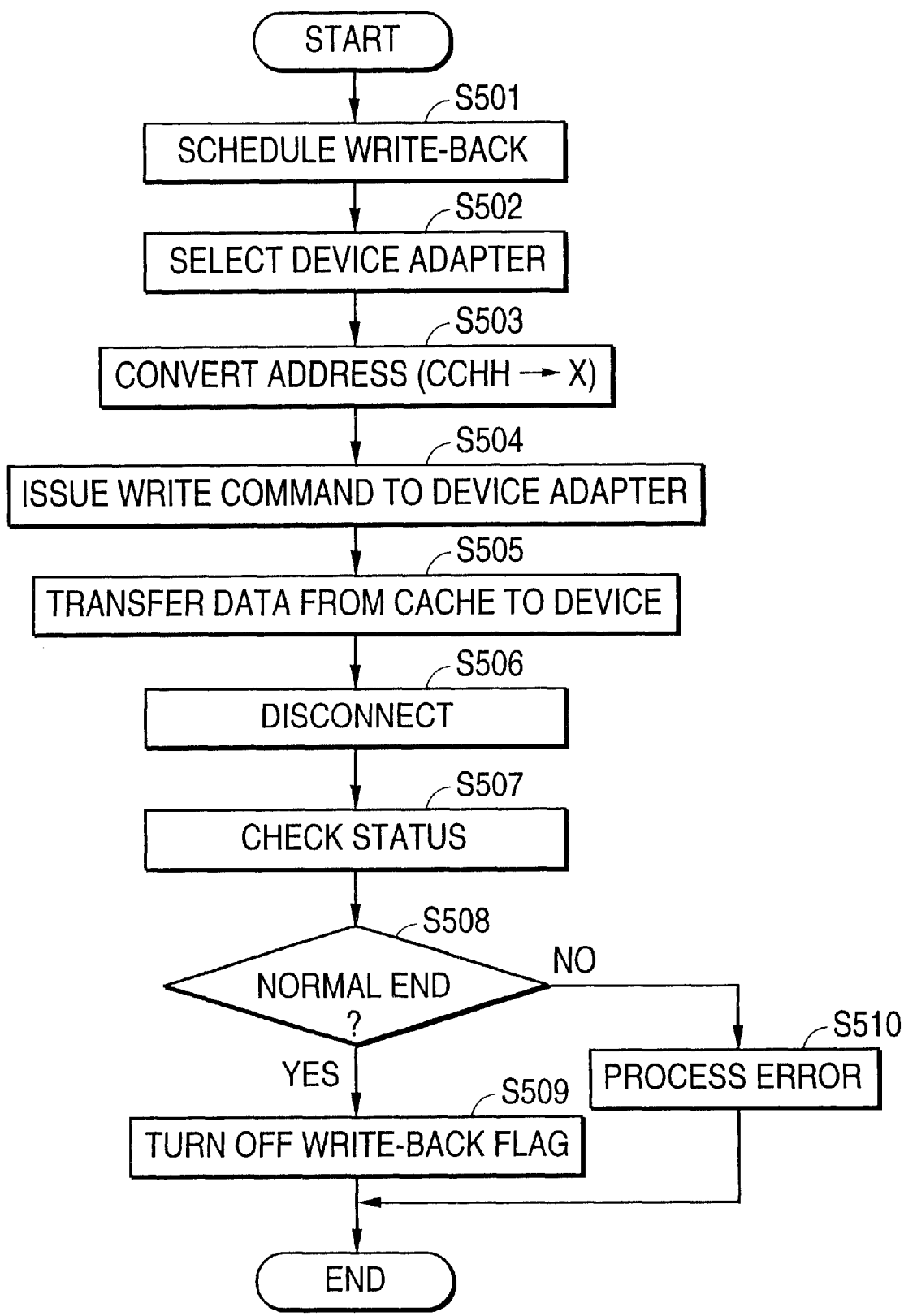
FIG. 21 is a flowchart for write-back from a cache memory to a disk unit.

FIG. 21 shows a flowchart for writing back CKD track data from the cache memory 26 to the disk module 40.

The resources manager 30 of the disk control unit 10 shown in FIG. 5 schedules write-back processing at step S501. The processing is scheduled by referencing the cache control table of the cache memory 26. The resources manager 30 recognizes a cache block whose write-back flag is on and registers its entry address into the write-back schedule list.

At step S502, the device adapter 22 is monitored to see if it is in the ready state in which the adapter is free. Once the device adapter 22 has become ready, a device is selected for write-back processing. At step S503, the position address CCHH of the cache block at the beginning of the write-back schedule list is given to the address conversion unit 82 of the selected device adapter 40 to convert it into the first logical FBA block number X of the disk module 40 using expression (1) above. At step S504, a write command is issued to the selected device adapter 22.

At step S505, one CKD track of data in the target cache block is transferred from the cache memory 26 to the selected device 22 for write-back. The device adapter 22 issues a write-back command to the disk module 40 in this way. In this state, the device adapter 22 disconnects the disk module 40 at step S506. At step S507, the status of the disk module 40 is monitored by using a status command.

If write-back data is written normally into the disk module 40, normal termination is recognized at step S508. At step S509, the write-back flag of the written-back cache block is returned to off in the cache control table of the cache memory 26. If data is not written normally into the disk module 40 at step S508, the write command is issued again to the disk module 40 or other error processing is executed at step S510.

The CKD track data changed in the cache memory 26 is written back to the disk module 40. This write-back processing keeps the CKD track data in the cache memory 26 identical to the CKD track data divided using FBA blocks and stored in the disk module 40.

Data in the cache memory 26 is eliminated from the cache memory 26 by using the LRU algorithm unless accessed from the open server 14. If the write-back flag is on during this cache purging, data is written back with priority and cleared from the cache memory 26.

In the above form of execution, the disk control unit 10 processes access to the disk module 40 in daily operation by using the open server 14, and the global server 12 backs up data created by the open server 14 in the disk module 40. If access to the disk control unit 10 does not cause contention between the global server 12 and the open server 14, this example is applicable not only to operation by using the open server 14 or backup by using the global server 12 but to appropriate forms of execution.

In the above form of execution, one CKD track on a disk module 40 to be initialized by using the global server 12 includes two records, R1 and R2. However, the number of records can be changed as required. The logical FBA block size of data that uses the FBA format and the physical FBA block size of disk modules 40 can also be determined appropriately. These values are not limited by the form of execution.

The present invention includes appropriate variations not affecting its purposes and advantages.

As explained so far, the present invention allows host devices that use the CKD format and the FBA format to be connected individually by using dedicated channel adapters. Disk control is based on a function that converts the CKD format of data in a host device and the FBA format of data in a disk unit. As to access from a host device that uses the FBA format, the disk control can change the format to FBA to have host devices that use the CKD and FBA formats share resources in disk units.

In particular, if a global server known as an open frame is connected as a host device that uses the CKD format and a MUIX-PC or similar open server as a host device that uses the FBA format, the open server can be used for daily work and the global server can be used for the backup of data generated in the disk units. The sharing of resources can be implemented while taking advantage of the open server processing with high-performance daily transactions as well as the global server processing mass data in an arbitrary frame size at high speed and with high reliability.

In addition to the format conversion functions, the present invention provides characteristics to the formats to increase processing speed.

Concerning the above explanations, the following items are additionally disclosed:

(1) In the disk control unit of the present invention, the address conversion unit calculates:

(a) the physical address of a physical block corresponding to the logical address of a logical block as:

Physical address=Logical address×(Logical block size/Physical block size)

(b) a CKD-format cylinder number as the quotient of

Cylinder number={Physical address+Number of blocks/track×(Number of tracks/cylinder+1)}/(Number of blocks/track×Number of tracks/cylinder)

(c) a CKD-format track number as the quotient when the remainder obtained from the calculation of the cylinder number is divided by the number of blocks per track, and (d) a CKD-format sector number with the remainder obtained from the calculation of the cylinder number and the number of physical blocks in each record.

(2) In the disk control device of the present invention disclosed in (1), access commands are processed for daily work by the second host device and for backup by the first host device.

(3) In the disk control device of the present invention disclosed in (2), the resources manager includes an initializing unit that initializes each CKD track of the disk unit by dividing the track into several FBA blocks and placing an ID at the specified position of each FBA block to indicate the correspondence between the control numbers and positions of records contained in the FBA block, when the first host device issues an initialize command.

(4) In the disk control device of the present invention disclosed in (3), the initializing unit formats a disk unit by dividing a CKD track into logical FBA blocks, an integral multiple of physical FBA blocks on the disk unit, and allocating the ID at the corresponding position in the first physical FBA block of each logical FBA block, with records in the second and later physical FBA blocks from the back.

(5) In the disk control device of the present invention disclosed in (4) the CKD track includes home address HA, record R0 as the system area, and records R1 and R2 as the user area. Also in the disk control device of the present invention disclosed in (4), the initializing unit formats a disk unit by dividing a CKD track into logical FBA blocks, an integral multiple of physical FBA blocks on the disk unit, and placing the home address HA and record R0 in the first logical FBA block and the records R1 and R2 in the remaining logical FBA blocks from the back.

(6) In the disk control device of the present invention disclosed in (5), the physical FBA block has 512 bytes, the logical FBA block has 4,096 bytes (8 times the physical FBA block size), a track has 53 Kbytes (13 times the physical FBA block size), and the records R1 and R2 have 23 Kbytes each (45 times the physical FBA block size).

(7) In the disk control device of the present invention disclosed in (6), access from the second host device to the second host adapter is stopped when the initializing unit formats the disk unit.

(8) In the disk control device of the present invention disclosed in (7), access from the first host device to the first host adapter is stopped and only access from the second host device to the second host adapter is permitted after the initializing unit formats the disk unit.

(9) In the disk control device of the present invention disclosed in (8), access from the second host device is temporarily suspended and the resources manager transfers data from the disk device for backup data in accordance with a command from the first host device, when only access from the second host device to the second host adapter is permitted.

(10) In the disk control device of the present invention disclosed in (9), the resources manager backs up one or more logical volumes of data that uses the CKD format corresponding to logical volumes of data that uses the FBA format by referencing the volume definition information.

(11) In the control method of the disk control device of the present invention, the address conversion process calculates:

(a) the physical address of a physical block corresponding to the logical address of a logical block as Physical address=Logical address×(Logical block size/Physical block size)

(b) a CKD-format cylinder number as the quotient of

Cylinder number={Physical address+Number of blocks/track×(Number of tracks/cylinder+1)}/(Number of blocks/track×Number of tracks/cylinder)

(c) a CKD-format track number as the quotient when the remainder obtained from the calculation of the cylinder number is divided by the number of blocks per track, and (d) a CKD-format sector number with the remainder obtained from the calculation of the cylinder number and the number of physical blocks in each record.

(12) In the control method of the present invention disclosed in (11), access commands are processed for daily work by the second host device and for backup by the first host device.

(13) In the control method of the present invention disclosed in (12), an initialize process is prepared for initializing each CKD track of the disk unit by dividing the track into several FBA blocks and placing an ID at the specified position of each FBA block to indicate the correspondence between the control numbers and positions of records contained in the FBA block, when the first host device issues an initialize command.

(14) In the control method of the present invention disclosed in (13), the initialize process formats a disk unit by dividing a CKD track into logical FBA blocks, an integral multiple of physical FBA blocks on the disk unit, and placing the ID at the corresponding position in the first physical FBA block of each logical FBA block, with records in the second and later physical FBA blocks from the back.

(15) In the control method of the present invention disclosed in (14) the CKD track includes home address HA, record R0 as the system area, and records R1 and R2 as the user area. Also in the control method of the present invention disclosed in (14), the initialize process formats a disk unit by dividing a CKD track into logical FBA blocks, an integral multiple of physical FBA blocks on the disk unit, and placing the home address HA and record R0 in the first logical FBA block and the records R1 and R2 in the remaining logical FBA blocks from the back.

(16) In the control method of the present invention disclosed in (15), the physical FBA block has 512 bytes, the logical FBA block has 4,096 bytes (8 times the physical FBA block size), a track has 53 Kbytes (13 times the physical FBA block size), and the records R1 and R2 have 23 Kbytes each (45 times the physical FBA block size).

(17) In the control method of the present invention disclosed in (16), access from the second host device to the second host adapter is stopped when the initialize process formats the disk unit.

(18) In the control method of the present invention disclosed in (17), access from the first host device to the first host adapter is stopped and only access from the second host device to the second host adapter is permitted after the initialize process formats the disk unit.

(19) In the control method of the present invention disclosed in (18), access from the second host device is temporarily suspended and data is transferred from the disk device for backup data in accordance with a command from the first host device, when only access from the second host device to the second host adapter is permitted.

(20) In the control method of the present invention disclosed in (19), one or more logical volumes of data that uses the CKD format corresponding to logical volumes of data that uses the FBA format are backed up by referencing the volume definition information.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Reference Number List

10: Disk control device
12: Global server (first host device: mainframe)
14: Open server (second host device)
16-1, 16-2: Device cluster
18, 18-1, 18-2: First channel adapter
20, 20-1, 20-2: Second channel adapter
22, 22-1, 22-2: Device adapter
25: Arbitrary cache block
25-1, 25-2: Common bus
26, 26-1, 26-2: Cache memory
28-1; 28-2: Cache function engine (CFE)
30: Resources manager (RM)
32-1, 32-4: Channel devices
36-1, 36-2: SCSI channel device
38-1, 38-2: Extended device adapter (EDA)
40: FBA disk device (drive module DM)
42: MPU
44, 45: System storage
46: Bus
48: SCSI receiver/driver
50: SCSI protocol chip
52: Data transfer logic
56: Bus interface logic
58, 62, 64, 80, 84: Register
60, 82: Address conversion unit
66: Initializing unit
68, 68-1 to 68-3: Volume definition information
70: First control unit
72: Second control unit
74: Cache block
76: Record R1
78: Record R2
85: Logical FBA (target) track
86-1 to 86-13: Physical FBA block
88: Logical disk module
90-1 to 90-4: Logical volume, logical module
92: Volume label
94: Volume table of contents (VTOC)
96: Format area
98: CKD track
100: Logical FBA track
102: Physical FBA track
104: FBA blocks
104-1 to 104-13: Logical FBA track
106: COF-conversion ID
108-1 to 108-10: Physical FBA block
110: FBA block ID
112: Home address HA
114: Record R0
116: Record R1 count (R1C)
117: Record R2 count (R2C)
118: Partial block
120: Merged block
122: Blank area

What is claimed is:

1. A disk control device coupled to a first host device, a second host device, and a disk unit, said disk control device comprising:

a first channel adapter coupled between the first host device and the disk unit, said first channel adapter receiving a variable-block access (CKD) command from the first host device and returning processing results to the first host device;

a second channel adapter coupled between the second host device and the disk unit, said second channel adapter receiving a fixed-block access (FBA) command from the second host device and returning processing results to the second host device, said second channel adapter comprising an address conversion unit converting fixed-block position address LBA received from the second host device into variable-block position address CCHH;

a device adapter coupled to the disk unit and executing an access command from one of the first host device and the second host device to the disk unit in FBA blocks;

a cache memory coupled to the device adapter, to the first channel adapter, and to the second channel adapter, said cache memory developing and storing track data as cache blocks in a format that divides a single CKD block into several FBA blocks;

a cache function engine coupled to the cache memory and controlling the cache memory; and a resources manager coupled to the cache function engine, to the cache memory, to the first channel adapter, and to the second channel adapter, and managing general resources and controlling processing operations, said resources manager comprising:

a first controller calculating an FBA block number of the disk corresponding to variable-block position address CCHH received from the first host device, reading from the disk unit a CKD block including the FBA block indicated by said FBA block number, developing and storing the block in the cache memory, and searching the cache memory for a record specified by the first host device, and a second controller calculating an FBA block number of the disk corresponding to variable-block position address CCHH received from the second host device, reading from the disk unit a CKD block containing the FBA block indicated by the FBA block number, developing and storing the block in the cache memory, and searching the cache memory for a record specified by the second host device.

2. A disk control device as claimed in claim 1, said resources manager further comprising an initializing unit dividing one CKD track into several FBA blocks of a specified length, positioning an identification at the beginning of each logical FBA block, and placing the records of the CKD track in each FBA block.

3. A disk control device as claimed in claim 2, further comprising a CKD track including records R1 and R2 corresponding to the user area of several logical FBA blocks such that a first physical FBA block is preceded by the identification, the remainder is blank, and record R1 or R2 is divided and positioned sequentially from a second to the last physical FBA block.

4. A disk control device as claimed in claim 2, wherein the resources manager further includes volume definition information indicating correspondence between variable-block logical volume numbers of the first host device and fixed-block logical volume numbers of the second host device, wherein said disk unit is formatted for each variable-block logical volume number specified in the volume definition information when an initialize command is received from the first host device.

5. A control method of a disk control device, said disk control device comprising a first channel adapter coupled between a first host device and a disk unit and receiving a variable-block access command from the first host device and returning processing results, a second channel adapter coupled between a second host device and a disk unit and receiving a fixed-block access command from the second host device and returning processing results, a device adapter executing an access command from the first host device or the second host device for the disk unit in FBA blocks, a cache memory developing track data as cache blocks in a format that divides a single CKD block into several FBA blocks, a cache function engine controlling the cache memory, and a resources manager for managing general resources and controlling processing operations, said method comprising the steps of:

a first control process in which a corresponding FBA block number of the disk is determined for variable-block position address CCHH received from the first host device, a CKD block including the FBA block of the FBA block number is read from the disk unit and developed in the cache memory, and the cache memory is searched for a record specified by the first host device by referencing an identification correspondence;

an address conversion process in which FBA position address LBA issued from the second host device to the second channel adapter is converted into variable-block position address CCHH; and a second control process in which an FBA block number is calculated for a real device corresponding to variable-block position address CCHH obtained at the address conversion process, a CKD block containing the FBA block indicated by the FBA block number is read from the disk unit and developed in the cache memory, and the cache memory is searched for a record specified by the second host device.

6. A control method of the disk control device as claimed in claim 5, said disk control device further comprising a resources manager dividing one CKD track into several FBA blocks of a specified length, positioning the identification at the beginning of each logical FBA block, and placing the records of the CKD track in each logical FBA block.

7. A control method of the disk control device as claimed in claim 6, further comprising a CKD track including records R1 and R2 for the user area of several logical FBA blocks such that the first physical FBA block is preceded by the identification, with the remainder being blank, and record R1 or R2 is divided and positioned sequentially from the second to the last physical FBA block.

8. A control method of the disk control device as claimed in claim 1, further comprising an initializing process formatting the disk unit for each variable-block logical volume number specified in volume definition information, thereby indicating correspondence between the variable-block logical volume numbers of the first host device and fixed-block logical volume numbers of the second host device when an initialize command is received from the first host device.

9. An apparatus coupled to a first host device issuing a variable-block position address, a second host device issuing a fixed-block position address, and a disk unit storing data in fixed-block format, said apparatus comprising:

a disk control device of variable-block format converting the variable-block position address issued by the first host device to a first fixed-block position address and accessing the disk unit based upon the first fixed-block position address, and converting the fixed-block position address issued by the second host device to a variable-block position address then to a second fixed-block position address, and accessing the disk unit based on the second fixed-block position address.

10. A method for controlling a fixed-block format disk unit coupled to a first host issuing a variable-block position address and to a second host issuing a fixed-block position address, said method comprising:

converting by a disk control device of variable-block format the variable-block position address issued by the first host device to a first fixed-block position address and accessing the disk unit based upon the first fixed-block position address, and converting the fixed-block position address issued by the second host device to a variable-block position address then to a second fixed-block position address, and accessing the disk unit based on the second fixed-block position address.

11. A disk control device coupled to a disk unit storing data accessible by a fixed-block position address and to host devices issuing one of a fixed-block position address and a variable-block position address, said disk control device comprising:

a cache memory storing data accessible by variable-block position addresses;

a cache function engine coupled to and controlling the cache memory;

channel adapters, each of said channel adapters coupled to the cache memory and corresponding to and coupled to a respective one of the host devices, said channel adapters converting the fixed-block position addresses issued by and received from the host devices to corresponding variable-block position addresses, accessing the cache memory based on the converted variable-block position addresses or on variable-block position addresses issued by and received from the host devices, and converting the variable-block position addresses to fixed-block position addresses if the one of the host devices issued a fixed-block position address; and a device adapter coupled to the disk unit and converting the variable-block position addresses to fixed-block position addresses if the disk unit is accessed by the disk control device.

12. A method of controlling a disk control device coupled to a disk unit storing data accessible by a fixed-block position address and to host devices issuing one of a fixed-block position address and a variable-block position address, said method comprising:

converting by channel adapters provided in the disk control device the fixed-block position addresses issued by and received from the host devices to corresponding variable-block position addresses;

accessing a cache memory provided in the disk control device based on the variable-block position addresses;

converting the variable-block position addresses to fixed-block position addresses if the one of the host devices issued a fixed-block position address; and converting by a device adapter provided in the disk control device the variable-block position addresses to fixed-block position addresses if the disk unit is accessed by the disk control device.

13. A system comprising:

a disk unit storing data accessible by a fixed-block position address;

host devices issuing one of a fixed-block position address and a variable-block position address; and a disk control device coupled between the disk unit and the host devices, said disk control device comprising:

a cache memory storing data accessible by variable-block position addresses, channel adapters, each of said channel adapters coupled to the cache memory and corresponding to and coupled to a respective one of the host devices, said channel adapters converting the fixed-block position addresses issued by and received from the host devices to corresponding variable-block position addresses, accessing the cache memory based on the variable-block position addresses, and converting the variable-block position addresses to fixed-block position addresses if the one of the host devices issued a fixed-block position address, and a device adapter coupled to the disk unit and converting the variable-block position addresses to fixed-block position addresses if the disk unit is accessed by the disk control device.

14. A disk control device coupled to a disk unit storing data accessible by a fixed-block position address, to a first host device issuing a fixed-block position address, and to a second host device issuing a variable-block position address, said disk control device comprising:

a cache memory storing data accessible by a variable-block position address; and a first channel adapter coupled to the cache memory and corresponding to and coupled to the first host device, said channel adapter converting the fixed-block position address issued by and received from the first host device to a corresponding variable-block position address, accessing the cache memory based on the variable-block position address;

a second channel adapter receiving the variable-block position address from the second host device and accessing the cache memory based on the variable-block position address; and a device adapter coupled to the disk unit and converting the variable-block position addresses to corresponding fixed-block position addresses if the disk unit is accessed by the disk control device.

15. A disk control device coupled to a first host device, a second host device, and a disk unit, said disk control device comprising:

a first channel adapter coupled between the first host device and the disk unit that is formatted based on a second format, said first channel adapter receiving a first formatted access command from the first host device and returning processing results to the first host device;

a second channel adapter coupled between the second host device and the disk unit that is formatted based on a second format, said second channel adapter receiving a second formatted access command from the second host device and returning processing results to the second host device; and said first channel adaptor comprising:

a first controller calculating a target block number of the disk unit corresponding to an address based on the first formatted access command received from the first host device, reading from the disk unit a target block indicated by said target block number, developing and storing the block in a cache memory, and searching the cache memory for a record specified by the first host device, and said second channel adaptor comprising:

a second controller reading from the disk unit the target block indicated by the block number based on the second format, and developing and storing the block in the cache memory specified by the second host device.

* * * * *